(12) United States Patent
Lee

(10) Patent No.: US 10,517,226 B2
(45) Date of Patent: *Dec. 31, 2019

(54) SPECTRAL DEFICIENCY DRIVEN CONTROL SYSTEMS AND METHODS IN PLANT GROWTH AUTOMATION

(71) Applicant: Infinity Capital, LLC, Portola Valley, CA (US)

(72) Inventor: Sam Lee, Portola Valley, CA (US)

(73) Assignee: INFINITY CAPITAL LLC, Portola Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/715,111

(22) Filed: Sep. 25, 2017

(65) Prior Publication Data
US 2019/0008096 A1      Jan. 10, 2019

Related U.S. Application Data

(63) Continuation-in-part of application No. 15/432,735, filed on Feb. 14, 2017.

(51) Int. Cl.
| H05B 37/02 | (2006.01) |
| A01G 7/04 | (2006.01) |
| H05B 33/08 | (2006.01) |

(52) U.S. Cl.
CPC .......... *A01G 7/045* (2013.01); *H05B 33/0851* (2013.01); *H05B 33/0854* (2013.01); *H05B 33/0869* (2013.01); *H05B 33/0872* (2013.01)

(58) Field of Classification Search
CPC ............ H05B 37/0227; H05B 37/0245; H05B 37/0272; H05B 37/0281; A01G 7/045; A01G 31/02

USPC ........................................................ 315/312
See application file for complete search history.

(56) References Cited

U.S. PATENT DOCUMENTS

| 2015/0264776 A1* | 9/2015 | Amarin .............. G06Q 10/0875 315/129 |
| 2015/0289328 A1* | 10/2015 | Conrad .............. H05B 33/0863 315/152 |
| 2016/0064204 A1* | 3/2016 | Greenberg ............ H01J 65/042 315/113 |
| 2016/0113213 A1* | 4/2016 | Berinsky ................ A01G 7/045 47/58.1 LS |

(Continued)

*Primary Examiner* — Tung X Le
(74) *Attorney, Agent, or Firm* — Fernandez & Associates, LLP; James M. Harris

(57) ABSTRACT

Disclosed is a spectral deficiency-driven control system in a plant growth automation, the system comprising: a facilities resource management system; a processor; a memory element coupled to the processor; encoded instructions; wherein the system is further configured to: over a network, receive at least one of a facility systems data; based on the received facility systems data, control an action via the facilities resource management system; wherein the received facility systems data is gathered via at least one facility sensor configured to detect facility-incoming and, or facility-generated light spectra and a sensor manager for determining a deficiency in light spectra; and wherein the actions controlled by the facilities resource management system is augmenting at least one of a spectral output of at least one light-emitting diode (LED) channel from at least one LED light source; light brightness; and, or a light height adjustment, based on the spectral deficiency.

29 Claims, 20 Drawing Sheets

(56) References Cited

U.S. PATENT DOCUMENTS

2016/0286629 A1\* 9/2016 Chen ................. H05B 37/0272
2018/0010817 A1\* 1/2018 Magcale .................. G06F 1/20
2018/0284016 A1\* 10/2018 Fujiyama ............. G01N 21/359

\* cited by examiner

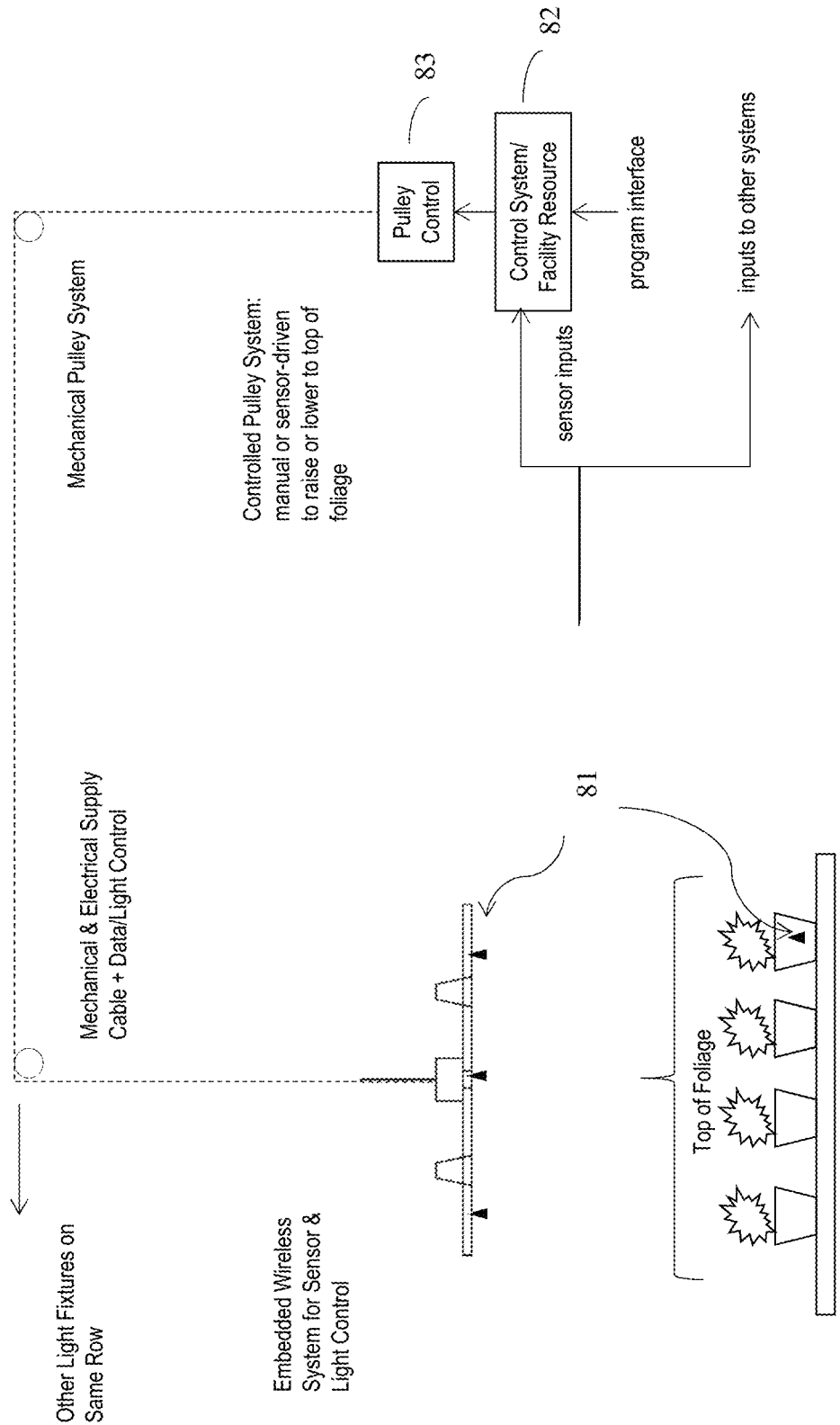

SPECTRAL DEFICIENCY DRIVEN CONTROL SYSTEMS AND METHODS IN PLANT GROWTH AUTOMATION

CROSS-REFERENCE TO RELATED APPLICATION

This application claims the benefits of U.S. Non-Provisional patent application Ser. No. 15/432,735, filed on Feb. 14, 2017, and the subject matter thereof is incorporated herein by reference in its entirety.

BACKGROUND OF THE INVENTION

Field

The present invention relates to an integrated feedback-driven control system and method, especially with respect to augmenting light spectra based on a detected deficiency of light spectra within a plant growth facility due to refraction by structural materials or air particulates.

Related Art

Our current systems of production and consumption of horticultural products are unsustainable and are causing rapid resource depletion, pollution, degradation of ecosystems and the threat of climate change. Industrial development and innovation are the touchstone to delivering sustainable food, energy and water. To this end, plant growth facilities have been known in the market and art to help reduce the burdens caused by our production and consumption trends. Plant growth facilities are facilities used to house plant growth chambers and, or plant growth rooms, and any associated components. The plant growth room and, or chambers are equipped with computerized environmental controls that control temperature, lighting, and humidity. These plant growth rooms provide a large growing area with programmable day length and temperature control, wherein controls and sensing elements interface with a microcomputer. Essentially, they are designed to maintain an ambient condition suitable for maximizing botanical yield, while minimizing carbon footprint. Normally, in order to sustain these optimal grow conditions, a plant growth room will have segregated feedback-driven controls-essentially controlling three major parameters: lighting, temperature, and irrigation. However, they lack a system or platform for integrating an array of sensors/controls in an automated control pipeline.

In addition to the lack of an expansive control regime, the extant systems for plant growth management have very limited lighting controls. Traditionally, these facilities employ high intensity discharge (HID) lamps to provide higher light intensity at plant canopy. Differing types of HID lamps provide for different spectrum of lights and thus a combination of the types are used to emphasize different growth phase of plants. Metal Halide produces more blue and used in the vegetative phase, whereas High Pressure Sodium produces more orange/red used for the flowering phase, for instance. These HID lamps may be additionally affixed to height-adjustable light frames. This arrangement does not compensate for changes in light intensity due to plant development or changes in light intensity due to environmental reasons. While newer plant growth facilities have begun to introduce light emitting diode (LED) lights—with multi-channel spectral modulation—they lack integration with an end-to-end control chain. These spectral control platforms do manage efficiencies by providing options to custom-schedule and tune spectra over the cloud. However, all of these lighting arrangements and schedules are considerably constrained, for they do not deliver a sensor feedback-driven spectral ratio, nor a dynamic adjustment of light intensity or light beam pattern. Effectively, the prior art and extant market have not enabled a way to create the "sun" with its almost infinite variation of spectrum and a series of "days" during the illumination cycle in a standardized or customized manner.

In terms of down-stream provisioning, the extant spectral control platforms do not allow users to create and customize specific grow recipes for light, irrigation, fertilization and, or environmental systems to optimize the holistic grow cycle of botanical species, and methods to transfer such recipes to other users of same type of application platform. Moreover, none of the extant systems take into account facility systems input, such as facility-incoming natural light, facility-generated light, and, or light spectra depletion due to air particulates within the facility, facility structural barriers, facility glass/object refraction, etc. As a result, current systems of plant growth automation are not delivering optimal spectral modulation, adaptively compensating for the inevitable leaching of facility-incoming or generated light spectra.

Embodiments disclosed address precisely such a need.

SUMMARY

Disclosed is an automated system and method to control at least one of a spectral, beam pattern and, or light intensity outputs of light sources by autonomously following a set of user-created recipe, with ability to incorporate one or more sensors to automatically adjust spectral, beam pattern and, or light intensity levels.

A system of one or more sensors and plant growth controls can be configured to perform particular operations or actions by virtue of having software, firmware, hardware, or a combination of them installed on an integrated platform that in operation causes or cause the platform to perform the actions. One or more computer programs can be configured to perform particular operations or actions by virtue of including instructions that, when executed by data processing apparatus, cause the apparatus to perform the actions.

One general aspect includes a plant growth management system, comprising a control system and a facilities resource management system, is configured to: over a network, receive at least one of a botanical characteristic data and, or facility systems data; based on the received botanical characteristic data and, or the facilities systems data, control an action via any one of, or combination of the control system and, or the facilities resource management system; and wherein the actions controlled by any one of, or combination of, the control system and, or the facilities resource management system is any one of, or combination of, a spectral control of at least one light-emitting diode (LED) channel from at least one LED light source; light brightness; and, or a light-beam path, wherein the light-beam path is caused by a light beam angle differential in any direction from a y-axis perpendicular to the LED light source, and modulation of which create a virtual height adjustment between any one of the light sources and a top of a foliage to maximize the photosynthesis efficacy of the light on the plant growth.

It is another object of the invention to provide for a plant growth management platform that additionally controls for height adjustment of light source to canopy, along with providing for irrigation and fertilization controls. In some embodiments, a pulley control mechanism may be tensionally coupled to a light source in order to achieve a "real adjustment" of height, which may be in conjunction with the "virtual adjustment" of height achieved by light beam pattern modulation. In other embodiments, a fertilizing and, or a watering unit (irrigation) may be in fluid communication to a foliage container unit, via a fluid supply line, and operably responsive to a sensor or an array of sensor feedback. The array of sensors may be configured to detect raw input related to any one of a foliage proximity, foliage moisture, foliage color, soil chemical, foliage growth stage, and, or growth time. This array of disparate sensors may employ a sensor manager or integration layer to integrate the raw input—regardless of sensor type or heterogeneous data formats.

It is yet another object of the invention for each action controlled by any one of the control system and, or facility resource management system to be supported by at least one custom application developed by at least one third party through an API gateway. An application platform to allow users to create and customize specific grow recipes for light, irrigation, fertilization and, or environmental systems to optimize the holistic grow cycle of botanical species, and to transfer such recipes to other users of same type of application platform. Furthermore, an "If This, Then That" script manager may be embedded to create a seamless control automation platform, wherein one pre-set command—once threshold-grade fulfilled—triggers a second action or set of actions.

In another generalized aspect of the invention, a plant growth management device is provided, whereby said device may comprise a processor; a memory element coupled to the processor; encoded instructions; wherein the device is further configured to: over a network, receive at least one of a botanical characteristic data and, or facility systems data; based on the received botanical characteristic data and, or the facilities systems data control an action: wherein the action controlled relate to varying spectral output of at least one light emitting diode (LED) channel from at least one LED light source, light brightness; and, or a light beam path from at least one LED light source and a top of a foliage for causing a virtual foliage height adjustment.

In yet another generalized aspect of the invention, a plant growth management method is disclosed, said method comprising the steps of: receiving at least one of a botanical characteristic data and, or facility systems data over a network; and controlling an action via any one of, or combination of the control system and, or the facilities resource management system based on the received botanical characteristic data and, or the facilities systems data, wherein the actions controlled are any one of varying spectral and brightness output of at least one light-emitting diode (LED) channel from at least one LED light source, light brightness, and, or a light-beam path for causing a virtual foliage height adjustment.

It is yet another object to claim and disclose a system, device, and method for incorporating spectral deficiency-driven controls in an end-to-end plant growth automation. An exemplary system may comprise a facilities resource management system; a processor; a memory element coupled to the processor; encoded instructions; wherein the system is further configured to: over a network, receive at least one of a facility systems data; based on the received facility systems data, control an action via the facilities resource management system; wherein the received facility systems data is gathered via at least one facility sensor configured to detect facility-incoming light spectra and a sensor manager for determining a deficiency in light spectra; and wherein the actions controlled by the facilities resource management system is augmenting at least one of a spectral output of at least one light-emitting diode (LED) channel from at least one LED light source; light brightness; and, or a light height adjustment, based on said deficiency.

It is another object to disclose and claim an integrated device for detecting, processing, and delivering any number of plant growth automation outputs based on a detected spectral-deficiency of facility incoming and, or generated light. An exemplary integrated device may comprise at least one sensor portion; at least one embedded sensor manager; at least one multi-channel light output portion; a processor; a memory element coupled to the processor; encoded instructions; wherein the device is further configured to: receive at least one of a facility systems data by the at least one sensor portion; based on the received facility systems data, the embedded sensor manager determine a threshold-grade deviation between the received facility systems data and an updated reference facility systems data profile; and based on the threshold-grade deviation, cause any one of, or combination of, spectral modulation, light intensity variation, and, or light height variation from the at least one multi-channel light output portion.

It is yet another object to provide for a method for spectral deficiency-driven control in a plant growth automation. The method may comprise the steps of: (1) receiving at least one of a facility systems data over a network; and (2) controlling an action via any one of, or combination of a facilities resource management system based on the facilities systems data, wherein the actions controlled are at least one of varying spectral and brightness output of at least one light-emitting diode (LED) channel from at least one LED light source, light brightness, and, or a light-beam path for causing a virtual foliage height adjustment.

BRIEF DESCRIPTION OF THE DRAWINGS

FIG. 8 illustrates an exemplary mechanical system diagram according to aspects of the invention.

DETAILED DESCRIPTION

The following is a detailed description of embodiments of the invention depicted in the accompanying drawings. The embodiments are introduced in such detail as to clearly communicate the invention. However, the embodiment(s) presented herein are merely illustrative, and are not intended to limit the anticipated variations of such embodiments; on the contrary, the intention is to cover all modifications, equivalents, and alternatives falling within the spirit and scope of the appended claims. The detailed descriptions below are designed to make such embodiments obvious to those of ordinary skill in the art.

As stated above, the traditional way of collecting data and integrating those inputs for conversion into an automated flow of plant management controls is now struggling to cope with new challenges brought by the growing complexity of an array of sensors, vast data points, segregated controllers, and the innumerable number of applications. Embodiments disclosed include systems and methods that address these challenges effectively and efficiently. Embodiments disclosed include a plant growth management system employed to continuously gather, diagnose and predicted the condition of botanics, and make the necessary controller/application actions. A holistic management system and method of controlling at least one botanical growing parameters by utilizing at least one sensor input and deriving desired output of light, fertigation and, or environmental systems in indoor growing environments is disclosed. More specifically, an automated system and method to control at least one of a spectral, beam pattern and, or light intensity outputs of light sources by autonomously following a set of user-created recipe, with ability to incorporate one or more sensors to automatically adjust spectral, beam pattern and, or light intensity levels is provided.

Figure 1:
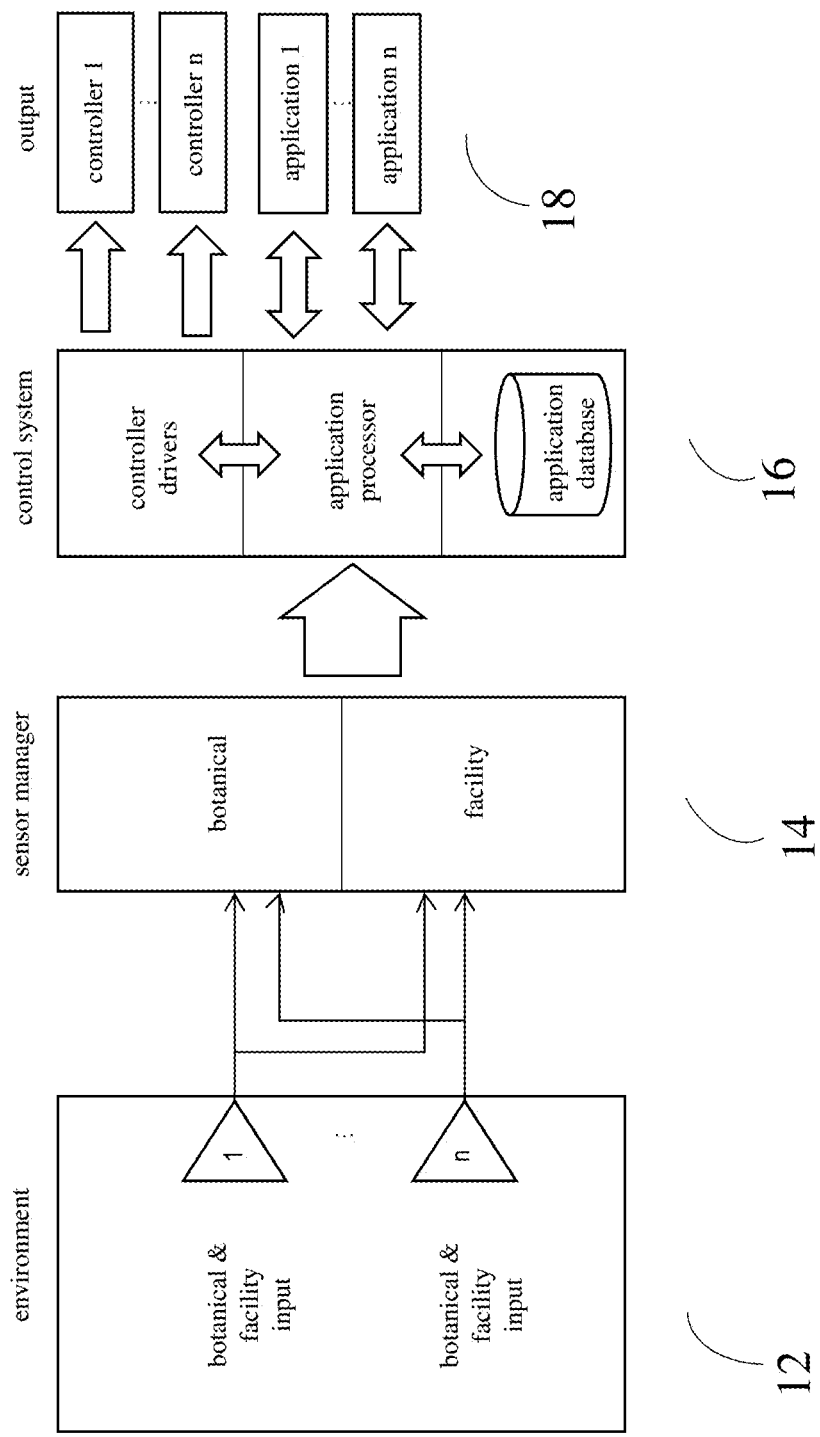
FIG. 1 illustrates an exemplary interaction flow diagram according to aspects of the invention.
Figure 2:
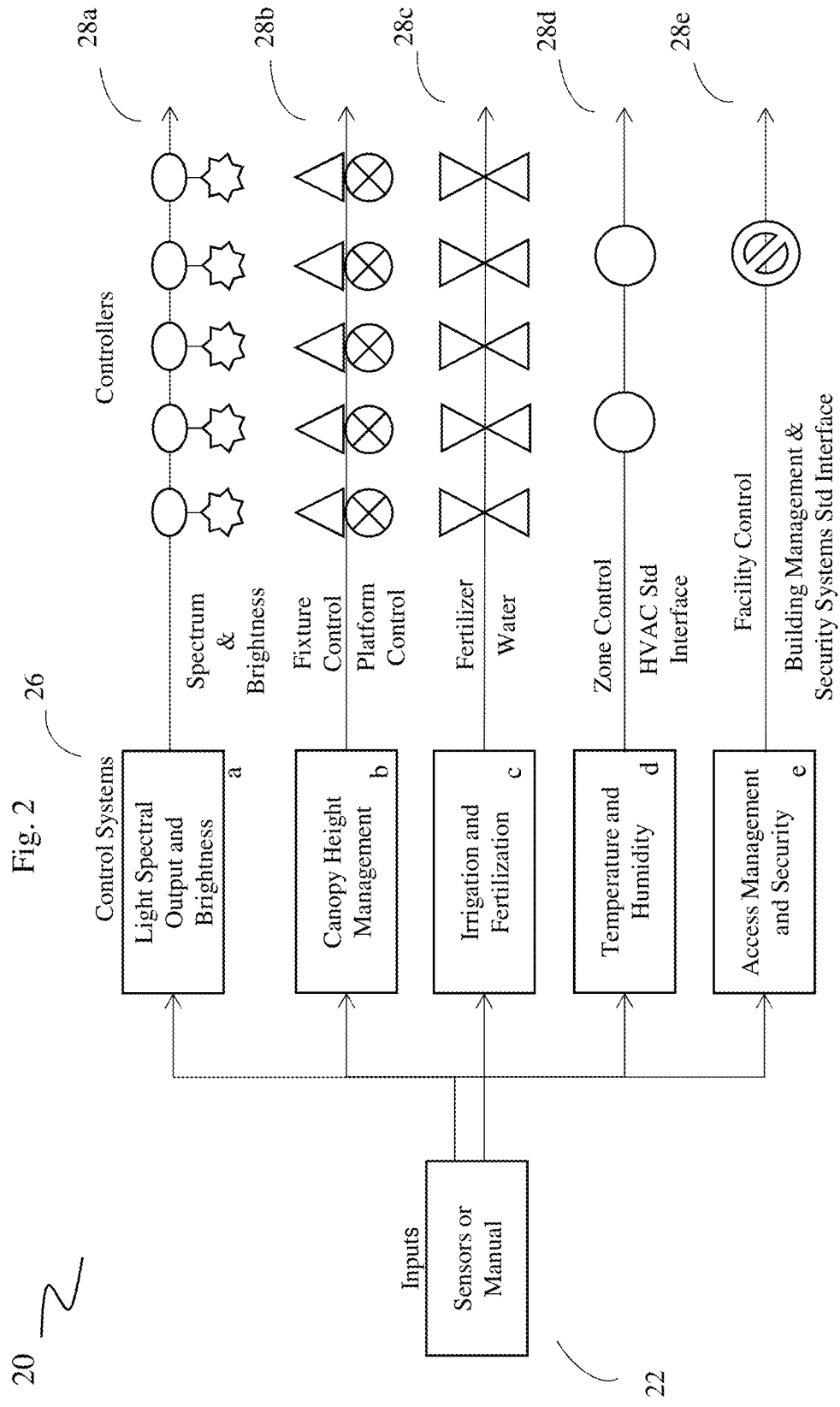
FIG. 2 illustrates an exemplary interaction flow diagram according to aspects of the invention.

FIGS. 1 and 2 illustrate an exemplary interaction flow in accordance with an aspect of the plant growth management system. The illustrated embodiment includes a plant growth management system 10, 20 comprising: a control system 16, 26; a facilities resource management system; a processor: a memory element coupled to the processor; encoded instructions; wherein the system 10, 20 is further configured to: over a network, receive at least one of a botanical characteristic data and, or facility systems data 12, 22; based on the received botanical characteristic data and, or the facilities systems data 12, 22 control an action via any one of, or combination of the control system 16, 26 and, or the facilities resource management system; and wherein the actions controlled by any one of, or combination of, the control system 16, 26 and, or the facilities resource management system is any one of, or combination of, a spectral control of at least one light-emitting diode (LED) channel from at least one LED light source 18, 28a; light brightness 18, 28a; and, or a light-beam path 18, 28a, wherein the light-beam path 18, 28a is caused by a light beam angle differential in any direction from a y-axis perpendicular to the LED light source, and modulation of which create a virtual height adjustment between any one of the light sources and a top of a foliage.

In a preferred embodiment, the received botanical characteristic data, and, or the facilities systems data 12, 22 may be received from at least one sensor; one sensor type; an array of sensors, and, or an array of sensor types. The variety of sensors that may be employed are, but not limited to, proximity sensors, temperature sensors, humidity sensors, gas detecting sensors, soil nutrients sensors, moisture sensors, light wavelength, beam pattern, and brightness sensors, etc. In an embodiment of the present invention, the data captured by the one or more sensors 12,22 is first sent to the sensor manager 14 and thereby, sent to the processing unit over the network. Alternatively, the processed botanical and facility input 12, 22 from the sensor manager 14 is streamed directly for processing by the control system 16, 26 for rendering a variety of controller and application output. This streaming of input 12, 22, processed input, and output for controller/application action 18, 28 may be over a short range wireless communication protocol. Examples of the short range wireless communication medium include Bluetooth, ZigBee, Infrared, Near Field Communication (NFC) and Radio-frequency identification (RFID).

In continuing reference to FIGS. 1 and 2, the facility or botanical data 12, 22 captured by the sensor or array of sensors related to either, or both, a facility and, or botanical parameter, may be communicated to the sensor manager 14 and, or the control system 16, 26, which will relay input signals from sensors and relay output commands to any one of, or combination of controllers 18, 28. The control system 16, 26, comprising of a controller processor, controller driver, application processor, and database, codes the data 12, 22 to actuate any one of, or combination of, a light control 28a for adjusting spectral ratio, light intensity, and, or light beam pattern 26a; a fixture and, or platform control 28b for adjusting height between light source and canopy 26b: a fertilizer and, or watering unit 28c for fertilization and, or irrigation 26c; HVAC unit for zone temperature and humidity control 28d; and, or a facility system control 28e.

In one embodiment, system configuration may include controllers 18, 28 that wirelessly communicates with the sensor manager 14, control system 16, 26 through any short-range mode of wireless communication, such as Wi-Fi, UWB, Bluetooth, ZigBee, or any protocol standards for short range wireless communications with low power consumption. In another configuration, the flow of data communication may be the through a wired connection where each controller 18, 28 would be wired to a control system 16, 26 through USB, or any cable, connector and communication protocols used in a bus for connections, communications, and power supply for electronic devices. Each controller 18, 28 can be powered through the control system 16, 26, or independently powered. Additionally, a power cord may be plugged into a standard AC 120V socket, which is attached to the controller 18, 28. In one embodiment, the controller 18, 28 may have a power cord or control wire that will plug into the control system 16, 26. While in the present example, the controller 18, 28 and control system 16, 26 are networked via a cord or wire, other embodiments may include communicating over wireless short-range or long-range networks.

In one preferred embodiment, not shown in FIG. 1 or 2, a high-level initialization protocol may begin with establishing a control system 16, 26 and controller 18, 28 connections and confirming power of each. In another embodiment, the system may establish connection with each controller individually in a configuration void of the control system 16, 26. Next, the initialization protocol may confirm if each controller is in the optimal orientation; read extant input readings from all sensor inputs 12, 22; confirm foliage/canopy positioning—location relative to light source 28*a*, watering/fertilizing delivery 28*c*; determine if a sensor-captured composite profile and a reference profile discrepancy is threshold-grade; confirm servo motors or any other type of controller actuator are operational; command output to at least one controller 18, 28; and finally, safely confirm no overloading of circuitry or overheating. Optionally, verify in near real time that the actions called for by the controller outputs have indeed been executed by the sensor feedback. Further optionally, trouble shooting protocols may be initiated upon an error alert.

In another preferred aspect, also not shown in FIG. 1 or 2, a high-level communication protocol may include a controller library to create and store a programmed workflow (user-created grow recipes) of specific controller outputs 18, 28. This RecipeGrow paradigm allows for the system to follow an external recipe for control of environmental, botanical and facilities management systems to optimize the growth cycle for maximum yield or benefit. The controller library and, or control system 16, 26 may then send instructions to a controller 18, 28 via USB, USCI, I2C, SPI, UART, or other wireless communications protocols, which may, in turn, coordinate actuation of motors in series, or in parallel, to deliver the latent-free control output. The drive actuation of controller motors may use pulse-width modulation (PWM), allowing for variable control of a driver and actuator. Machine learning and predictive algorithms may update the content of the controller library. Machine learning and predictive analytics applied to sensor feedback is used to determine whether plant growth matches the expected results based on the recipe, and the ability to automatically "advance" or "revert" the recipe to differing grow stage based on allowed parameters of the application program. If the sensor feedback provides a threshold-grade discrepancy that cannot be resolved by the rules engine of the recipe application program, a major error alert will be pushed in the form of a dashboard alert formatted for an interface display.

Figure 4:
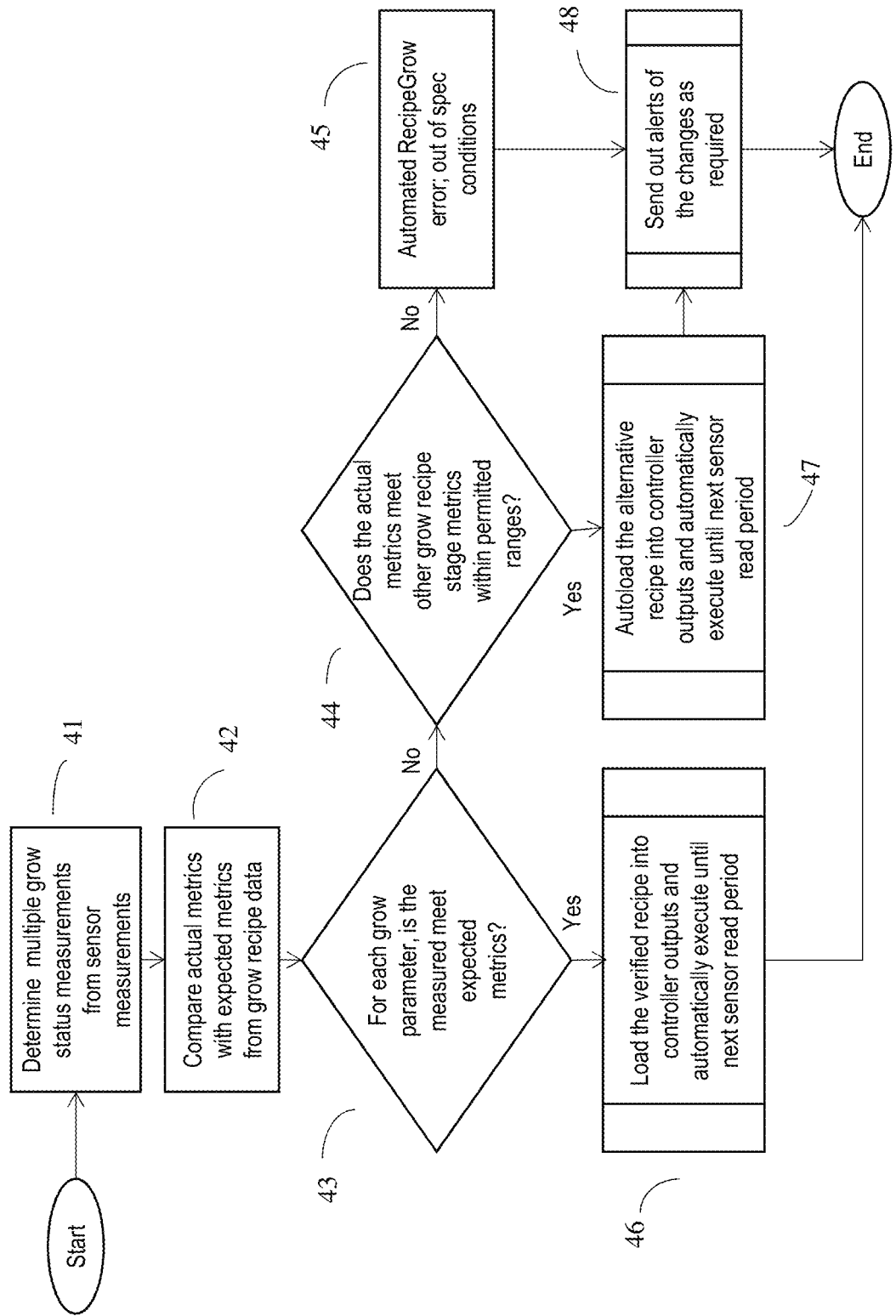
FIG. 4 illustrates an exemplary process flow diagram according to aspects of the invention.

Shown in FIG. 4 is a general initialization flow illustrating the feedback-driven RecipeGrow automated system. In the first step, the system determines multiple grow status measurements from sensor measurements 41, compares the actual metrics with the expected metrics from the grow recipe data 42. The question is posed, for each grow parameter, is the measured metrics meet expected metrics? If yes, load the verified recipe into controller outputs and automatically execute until the next sensor read period 46. If no, does the actual metrics meet the other grow recipe stage metrics within permitted ranges (not outside threshold values) 44? If yes, auto-load the alternative recipe into controller outputs and automatically execute until next sensor read period 47; and alerts of changes are pushed 48. If no, a RecipeGrow error is confirmed and alerts are dispatched 48.

Back to discussions of the communication protocol, in yet another configuration, an autonomous facility resource management tool may ultimately determine the power requirements for each controller. For example, if the fixture or platform controller 28*b* will not require height adjustment, the facility resource management tool can dedicate increased compute and facility resources to spectral, brightness, and beam pattern controller 28*a*. As another example, within the lighting system, maximizing one channel and allowing other less needed channels to be lowered may allow for an effective management of lighting and, or total system power consumption. This improves the overall power efficiency of the system, without losing workflow efficiencies. Another embodiment of a communication protocol may be for a comprehensive safety monitoring system. The facility resource management tool may also continuously monitor circuit behavior, motor output, and other complex simultaneous and series systems to mitigate hazards. Attention of the operator and, or grower in the event of an emergency may be pushed in the form of a dashboard alert formatted for an interface display. The user interface and experience may also generate reports/alerts corresponding to the various sensed conditions and, or control outputs. These reports and alerts may enable a concerned party to track the progress of the plant growth life cycle. In an embodiment of the present invention, the concerned party is enabled to view the reports, as generated by the processing unit using one or more devices selected from the group comprising a smartphone, a computer, a laptop, a tablet, a personal digital assistant (PDA) and a mobile phone.

Some embodiments may include the addition of a remote server to provide for back-end functionality and support. The server may be situated adjacent or remotely from the system and connected to each system via a communication network. In one embodiment, the server may be used to support verification or authentication of a user and a mobile device application function. The remote server may be further configured to support a history function; help support a network sharing function; and support a recipe suggestion engine. The remote server may be further configured to provide the recipe-driven control system, which may further authenticate the user and retrieve usage data of the user and apply the data against a predefined criteria of use.

Other embodiments may include a remote server that is configured to provide a contextually-aware recipe suggestion engine, which may access the user history function and at least one user contextual information to cause the processor to display a suggested recipe on at least one display interface. In yet other embodiments, the control system 16, 26 and, or controllers 18, 28 may be associated with an Internet of Things, whereby the system and, or controllers are fully integrated into a facilities automation system, thereby providing additional contextual information for a contextually-aware recipe suggestion engine.

The server may include cloud provisioning and connected to each system via a communication network. The network may be any suitable wired network, wireless network, a combination of these or any other conventional network, without limiting the scope of the present invention. Few examples may include a LAN or wireless LAN connection, an Internet connection, a point-to-point connection, or other network connection and combinations thereof. The network may be any other type of network that is capable of transmitting or receiving data to/from host computers, personal devices, telephones, video/image capturing devices, video/image servers, or any other electronic devices. Further, the network is capable of transmitting/sending data between the mentioned devices. Additionally, the network may be a local, regional, or global communication network, for example, an enterprise telecommunication network, the Internet, a global mobile communication network, or any combination of similar networks. The network may be a combination of an enterprise network (or the Internet) and a cellular network, in which case, suitable systems and methods are employed to seamlessly communicate between the two networks. In such cases, a mobile switching gateway may be utilized to communicate with a computer network gateway to pass data between the two networks. Furthermore, an entire data package (sensor data, control outputs, recipes) may be "crowd-sourced" from any number of grow facilities to feed a wider array of data for richer analytics and provisioning. The network may include any software, hardware, or computer applications that can provide a medium to exchange signals or data in any of the formats known in the art, related art, or developed later.

Figure 3:
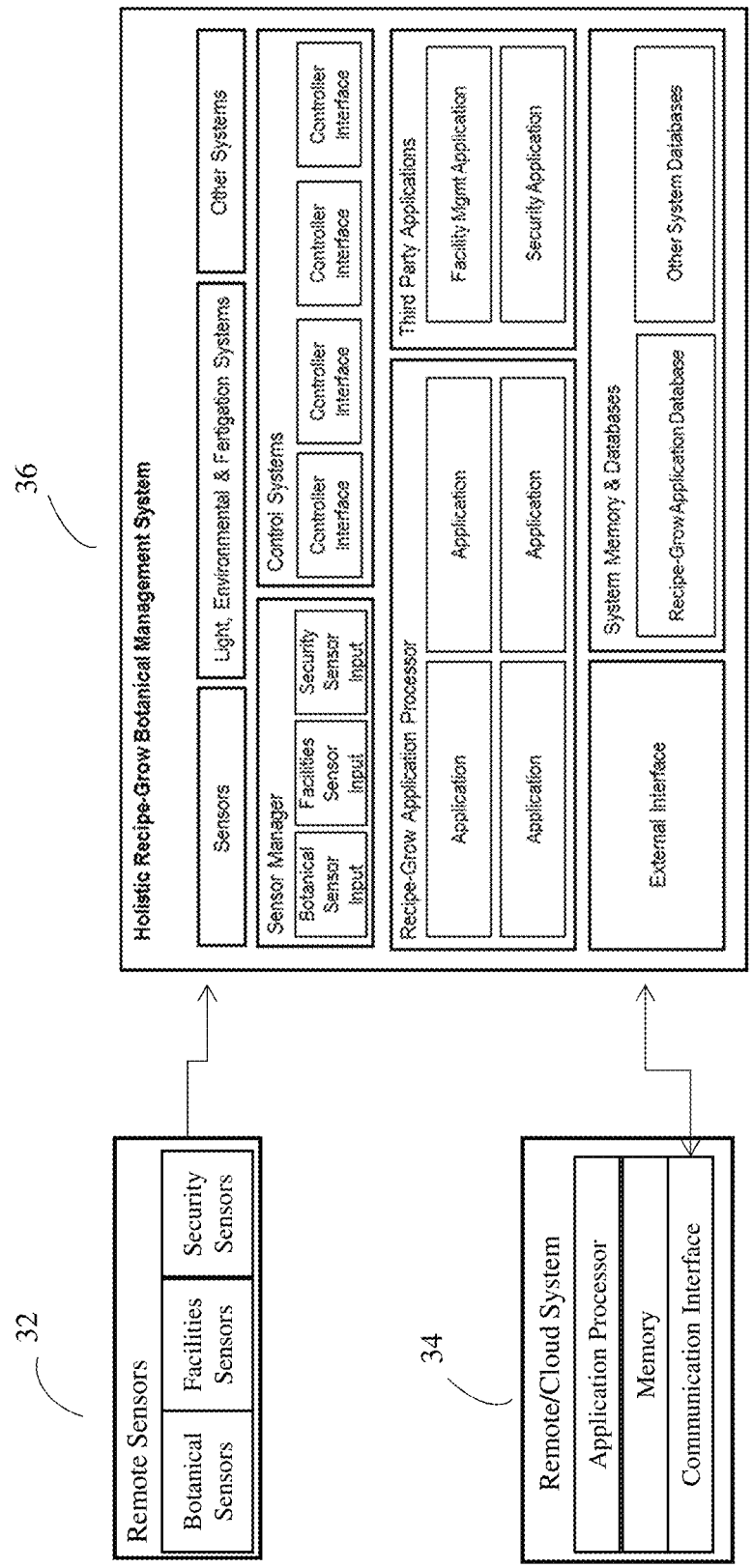
FIG. 3 illustrates an exemplary system diagram according to aspects of the invention.

Now in reference to FIG. 3. FIG. 3 depicts an exemplary system in accordance with an aspect of the invention, featuring a remote sensor unit 32, remote server/cloud unit 34, and a plant growth management system, or more particularly, a holistic recipe-grow botanical management system 36. The remote sensor unit 32 further comprises botanical sensor inputs, facility resource sensor inputs, and security sensor inputs. These multiple and heterogeneous data inputs may converge in an integration layer, such as a sensor manager, disposed within remote sensor unit 32 or the plant growth management system 36. The sensor manager may further manage the data packets—of varying format—and collate into discrete bundles of packets/formats. In other embodiments, the sensor manager may serve as a data format converter, converting the plurality of data formats—from disparate sensing devices—into a universally recognized format. In yet other embodiments, the plurality of data inputs and formats converge directly into an interaction policy layer in the plant growth management system 36 for any one of collating the disparate data formats from a multitude of devices; and, or, converting the disparate data formats into a universally recognized data format; and aggregating the bundled and, or converted data inputs for configuring a composite plant growth profile.

Sensing devices—however disparate—may communicate with either the sensor manager and, or the interaction policy layer wirelessly via Bluetooth—or any other short-range communication protocol—interfacing with any one of a mobile phone, Wi-Fi router and Wide Area Network access. The sensor manager aggregates any one of the botanical characteristic input, facilities resource input and generates a composite plant growth profile, and cross-references against a corresponding reference plant growth profile. The profiles, both composite and reference, take into account complete device behavior. Device behavior includes not only data output informed by raw sensor input, but also data output informed by network and device technical characteristic. Such technical characteristics may take into account network traffic, bandwidth, network bottlenecks, network malfunctioning, device malfunctioning, data acquisition infidelity, signal transduction jams, latency, grower/system operator feedback, etc. By taking in such device and network technical characteristics, the system or controller may be able to make a secondary assessment of a discrepancy threshold and rule out device or network malfunctioning—verifying that the threshold-grade discrepancy is solely due to plant growth characteristics. In some embodiments, the alert of a plant growth discrepancy and, or any of the automated controls is triggered only after the device and, or network anomaly is ruled out after the discrepancy threshold is reached.

Still in reference to FIG. 3, flagging or tagging a threshold discrepancy of an event between the composite plant growth profile and the reference plant growth profile to detect a threat or actuate a controller is determined by machine learning algorithms. In some embodiments, machine learning algorithms may be employed to inform a threshold discrepancy rater to determine whether a discrepancy threshold is threshold-grade. Further yet, a machine learning algorithm may be employed to inform more upstream processes, such as generating a composite plant growth profile and, or the reference plant growth profile. (Reference FIG. 4 process flow)

One control actuation that may be activated upon threshold-grade discrepancy is the lighting control. Any one of, or combination of, a spectral ratio, light intensity, or light beam pattern may be dynamically adjusted. In a preferred embodiment, the control system and, or the facilities resource management system may vary a spectral output of at least one of a plurality of light emitting diode (LED) spectral channels from a single LED light source or from an array of LED light sources. The single LED light source may comprise at least two distinct LED spectral channels, whereby at least one channel is active at any given time of a plant growth life cycle. Alternatively, any number beyond two LED spectral channels may be employed. In a preferred embodiment, the spectral output of any of the spectral channels is dependent on any one of, or combination of, botanical characteristics, plant growth life cycle stage, time, control system input, and, or facilities resource management system input.

Figure 6:
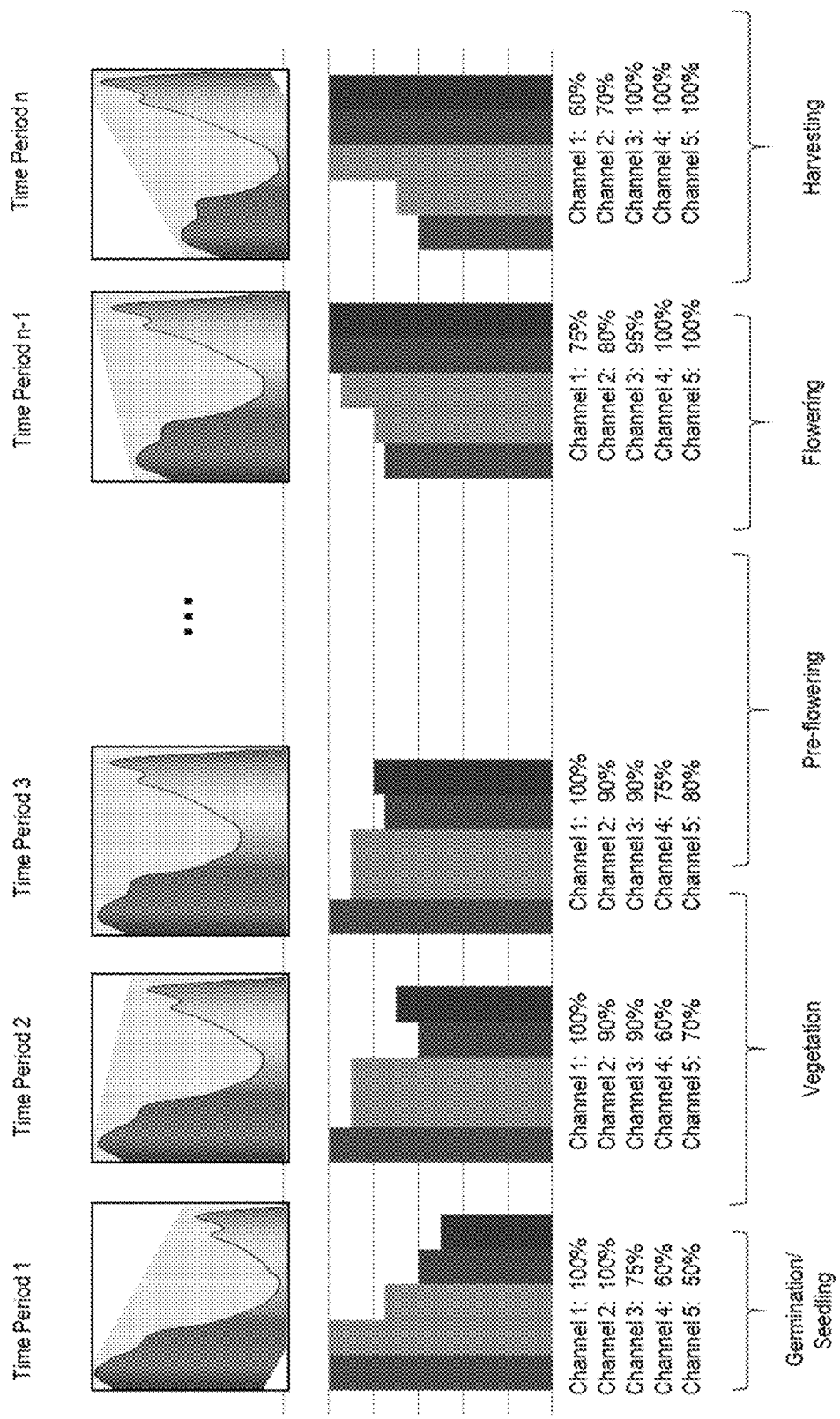
FIG. 6 illustrates an exemplary spectral graph according to aspects of the invention.

In terms of spectral ratio, specific light spectrum and wavelengths are critical for plant growth. The key wavelengths are the ones that drive the photosynthesis of plant by energizing chlorophyll A and B, the two type of molecules that convert light energy into sugar. Therefore, the most desired wavelengths are the parts of the spectrum that activates these two types of chlorophylls: 430-660 nm for chlorophyll A and 460-630 for chlorophyll B. Depending on the grow stage of the plant, it has been demonstrated in various studies that certain emphasis or de-emphasis of these wavelengths may produce more of the desired results and mitigate negative effects. For example, since during the flowering stage, blue wavelengths may not be as critical, the overall power budget of the light system could divert the power from blue spectrum to red spectrum. In essence, this would mean "turning down blue LEDs and turning up the red ones"—so the total amount of power of the light system can stay within the fixture design limit, yet producing the maximum amounts of specific wavelengths of light that are useful. Alternatively, vegetative stage of plant growth requires more relative blue spectrum, and the same methodology of increasing the outputs of blue wavelengths, while relatively decreasing the outputs of red wavelength may result in the same light fixture power efficiency. There is also research that shows that too much blue wavelengths during seedling stages will make them "leggy" as they tend to "chase" the blue source. As a result, a system that may dynamically vary spectral output of at least one of a plurality of light emitting diode (LED) spectral channels from a single LED light source or from an array of LED light sources exploits this light-plant growth phenomenon (see FIG. 6—spectral graph illustrating customized spectral control over time). As far as light intensity controls, studies suggest that an on-off step function type of system may have negative impacts on the health of the plants. Dimming over time would allow for artificial "sunrise and sunset". Also, dimming a specific channel(s) will allow the dynamic budgeting of total light output to maximize for desired wavelengths without exceeding the power limits.

In continuing reference to FIG. 3, one example of a light phenomenon triggering dynamic variability of spectral output may be detected deficiencies of spectra of incoming or generated light within a facility due to leaching. This detected deficiency by sensors may trigger at least one of a plurality of light emitting diode (LED) spectral channels from a single LED light source or from an array of LED light sources. Moreover, detected deficiencies of spectra may also trigger other controller outputs, such as light height adjustment-both real and virtual. Any one of, or combination of, a spectral ratio, light intensity, or light beam pattern may be dynamically adjusted.

As illustrated in FIG. 3, a spectral deficiency-driven control system in a plant growth automation is shown. The system may comprise a facilities resource management system; a processor 34; a memory element 34 coupled to the processor 34; encoded instructions; wherein the system is further configured to, over a network, receive at least one of a facility systems data 36 and control an action via the facilities resource management system; wherein the received facility systems data 36 is gathered via at least one facility sensor 32 configured to detect facility-incoming and, or facility-generated light spectra and a sensor manager 36 for determining a deficiency in light spectra; and wherein the actions controlled by the facilities resource management system 36 is augmenting at least one of a spectral output of at least one light-emitting diode (LED) channel from at least one LED light source; light brightness; and, or a light height adjustment, based on said deficiency.

In an exemplary embodiment, the facilities resource management system may comprise at least one of at least one facility sensor 32 configured for detecting facility-incoming and, or facility-generated light spectra; at least one sensor manager 36 for aggregating light spectra data from the at least one of the facility sensors 32 and for detecting a threshold-grade light spectra deviation from a reference light spectra profile; and a controller 36 for augmenting at least one of a spectral output of at least one light-emitting diode (LED) channel from at least one LED light source; light brightness; real light height adjustment; and, or a virtual light height adjustment based on a presence and amount of the threshold-grade light spectra deviation from the reference light spectra profile. The reference light spectra profile may be strictly the light spectra from incoming light detected by sensors 32 situated on top and exterior of the facility-unpolluted by structural or atmospheric interference. In other embodiments, an aggregate of sensor history and other contextual data may be data points forming the basis of the reference light spectra profile. Other sensor 32 and light spectra-related data may form the basis of the reference light spectra profile. Actual light spectra at the canopy-level (potentially compromised by atmospheric and, or structural interference) may be detected by sensors 32 disposed at or near the level of the canopy. The sensor manager 36 may compare actual light spectra at the canopy-level with the reference light spectra profile and detect a threshold-grade light spectra deviation for actionable augmentation.

Alternatively, the sensor manager 36 may aggregate facility-light output characteristics as part of a facility systems data 36. In other words, without actual sensor detection of light output, the sensor manager 36 may be able to gather data/meta-data of light output from facility or spectral-programmed lights to compare against a reference spectral profile in order to determine an actionable deficiency.

The facility sensor 32 may be at least one of a spectrometer, spectral radiometer, and, or a photo-sensor configured for detecting a facility-incoming and, or a facility-generated light spectra. The sensor 32 may be any one of a sensor 32 capable of detecting light spectra with a reasonable amount of resolution to delineate between spectrum wavelength bands. The sensor 32 may be operably communicative with at least one of a sensor manager 36 and, or a processor 34 for detecting a threshold-grade light spectra deviation from a reference light spectra profile; and capable of augmenting at least one of a controller-mediated function based on said deviation.

While not shown in FIG. 3, the at least one facility sensor 32 may be disposed on at least one of an exterior or interior of a plant growth facility; top of a foliage canopy; top of a foliage soil bed; on any one of a side of a foliage container unit; on any one of a side of a rack of foliage container units; on any one of surface of the actual light fixture providing light spectral output; and, or on any of a surface of the fixture delivering the controller-mediated function. Preferably, a light sensor 32 situated on the top and exterior of a facility will gather the incoming light and serve as at least one reference point as a basis for the reference light spectra profile. At least one other sensor 32 will be situated near the top of a canopy in order to receive an accurate reading of spectra at the canopy level and form the basis of the real-time actual light spectra at the canopy-level (unpolluted by structural or atmospheric interference). Any detected deficiency in spectra between the real-time, actual spectra reading and the reference spectra profile over a threshold-grade may trigger any of the above mentioned outputs. As a result, the configuration of sensors 32 with an operably coupled sensor manager 36 may detect the gradual leaching of optimal frequencies of incoming light spectra due to atmospheric or structural interference, and augment a spectral output to compensate for the leaching.

The sensor manager 36 may aggregate any one of the facilities resource input 36 and generates a composite facility systems data profile, and cross-references against a corresponding reference facilities systems data profile. Preferably, the sensor manager 36 may only require a single facility system input (light spectra) at the canopy-level and a single facility system input (light spectra) at the top and exterior of the facility to cross-reference for purposes of generating a spectral deficiency. The reference facilities systems data profile may be a single data input of light spectra captured by a sensor situated on top and exterior of the facility—not interfered by a facility structure or by its internal environment. In other embodiments, the reference facilities systems data profile may encompass user history of data capture by the said sensor, and, or other contextual data. The flagging or tagging of a spectral deficiency between the actual spectra and the reference facilities system profile may be determined by machine learning algorithms. In other embodiments, machine learning or probabilistic learning may be involved in developing and periodically updating the reference facilities system profile.

Still in reference to FIG. 3, at least one controller 36 may actuate and, or manage at least one of a plant growth automation system output based on the threshold-grade deviation determined by the sensor manager 36. The controller 36 may be operably coupled to the sensor manager 36 for causing any one of, or combination of, control, synchronization, coordination, and, or calibration of plant growth automaton systems, thereby enabling adaptive actuation or management of plant growth automation system outputs 36 based on the determined threshold-grade deviation. For instance, plant growth automation system outputs actuated and, or managed by the controller 36 may be at least one of a spectral output of at least one light-emitting diode (LED) channel from at least one LED light source and a light brightness, while not changing the light height adjustment. Alternatively, based on the sensor manager-determined threshold-grade deviation, the spectrally-tuned lights may remain unchanged, while simply altering the light brightness and altering the light height. Any one of, or combination of, controller-mediated outputs may be coordinated to augment the extent of the determined deficiency in light spectra. Any one of, or combination of, a spectral ratio, light intensity, or light beam pattern may be dynamically adjusted.

Figure 5:
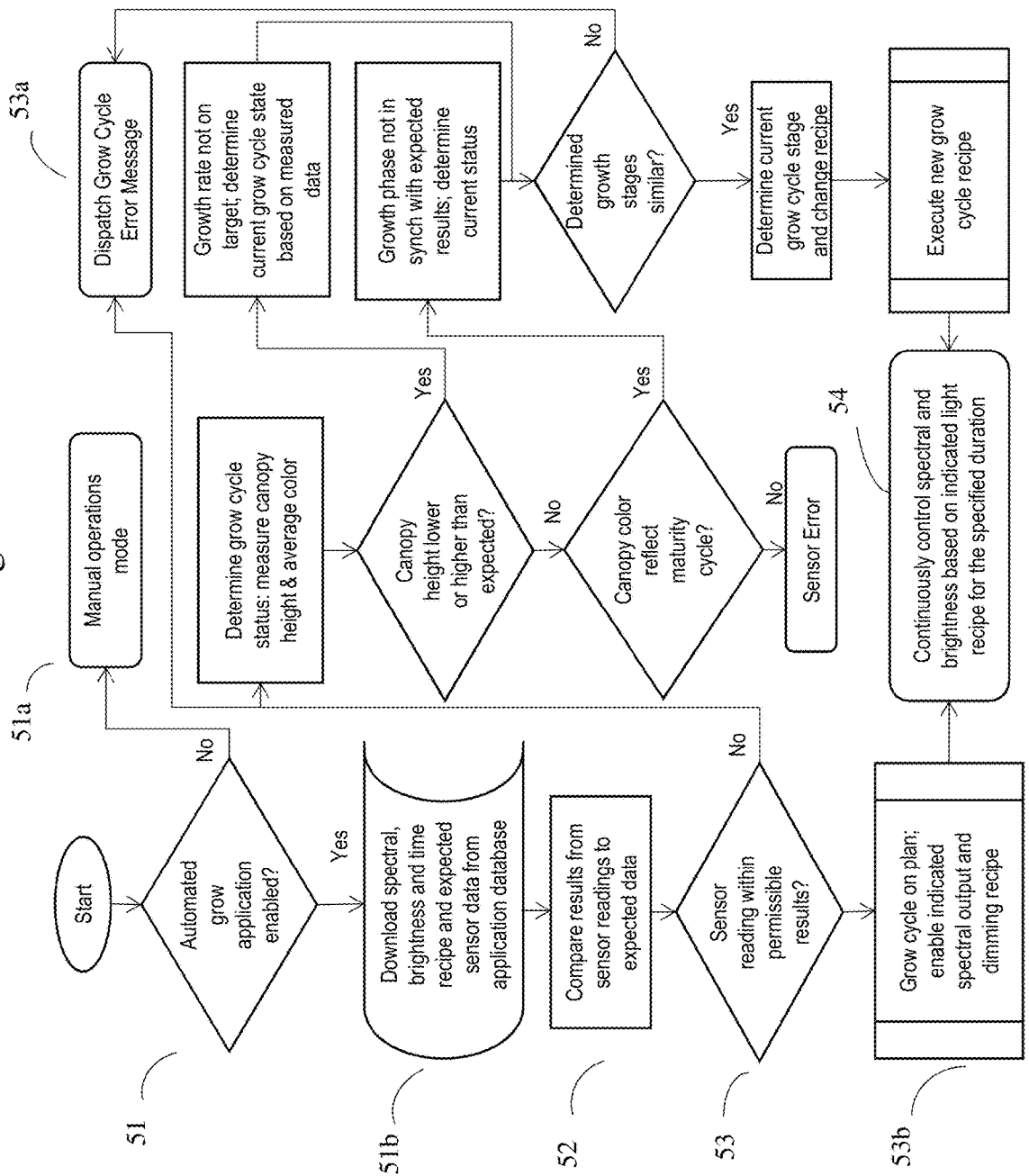
FIG. 5 illustrates an exemplary process flow diagram according to aspects of the invention.

FIG. 5 depicts an automated spectral output and brightness control flow. As illustrated in FIG. 5, the first step asks whether an automated grow application is enabled 51? If no, then a manual mode of operating spectral and brightness control may be activated 51a. If yes, then download the spectral and brightness recipe and expected sensor data from the application database 51b: compare results from sensor readings to expected data 52; and pose the next question: are sensor readings within permissible results 53. If no, dispatch grow cycle error message 53a; and if yes, the grow cycle is on plan and the lighting control system enables the indicated spectral output and dimming recipes 53b. Once enabled, continuously monitor and control spectral and brightness outputs based on indicated light recipes for a specific duration 54. Optionally, the automated spectral output and brightness control flow can further deploy the autonomous RecipeGrow methodology, wherein the system can automatically "advance" or "revert" to observed growth phase without manual intervention.

A light beam pattern—modulation of which may create for a "virtual canopy height/target distance of illumination" protocol—may serve as an additional lighting control. In a preferred embodiment, modulation of the ratio between pointed and broad-angle beam pattern may be used to vary the target distance of the photon energy. In alternative embodiments, the modulation of pivotable actuators coupled to pointed light sources and broad-angle light sources may provide for directional light beam patterns illuminating a foliage canopy. The pointed light beam pattern provides for plants to have a concentrated light energy delivery, whereas the broad-angle beam pattern increases the total light energy in the target area with potentially better delivery of light energy to lower canopy leaves. The lower canopy leaves may be shadowed by the upper foliage when only illuminated by focused light sources. In a preferred embodiment, one may set the range of the ratio between the focused, pointed versus diffused or broad lights for virtual target distance optimization and then within that range, provide for some variability to keep the physical characteristics of the plant. Optionally, if localized sensor can detect over-limit conditions, such as foliage temperature and, or distance between light fixtures and top of canopy, then a targeted variance of the beam pattern combination or intensity can be performed.

Figure 7A:
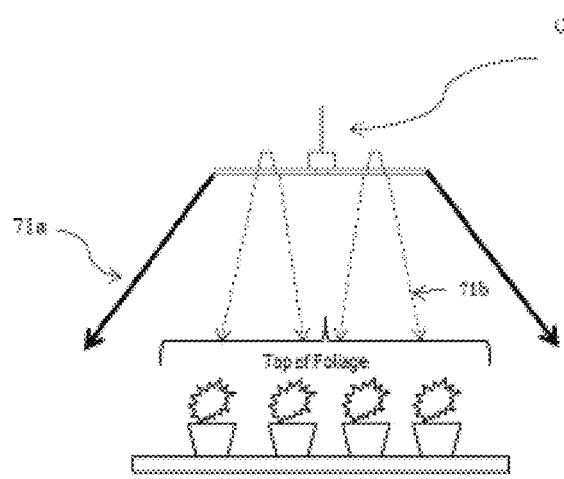
FIG. 7A illustrates an exemplary mechanical system diagram according to aspects of the invention.
Figure 7B:
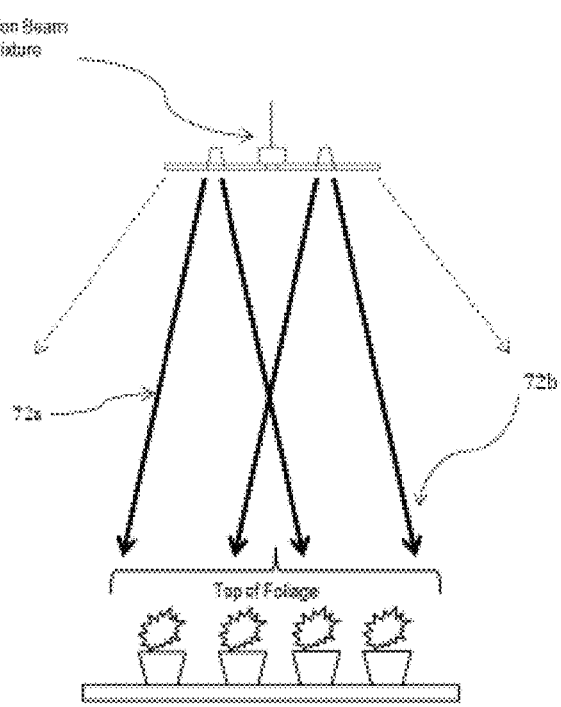
FIG. 7B illustrates an exemplary mechanical system diagram according to aspects of the invention.

Now in reference to FIG. 7, which depicts a virtual height adjustment flow using a light beam pattern control. In a high canopy or closer light scenario 71, strong output from linear wide angle beam sources creates a light beam pattern conducive for delivering a high level of light to target height without over-exposure 71a. Conversely, a weaker output from narrow angle light beam sources creates a light beam pattern conducive for delivering a weaker level of light to target height 71b. In a lower canopy or higher light scenario 72, a strong output from narrow angle beam sources result in high level of light delivery to target height without losing requisite amount of light delivery 72a. Further yet, weaker output from linear wide angle beam sources may complement for delivering a full complement of virtual height adjustment and light intensity 72b. These changes in angle and beam pattern reach create a virtual height adjustment between light source and foliage canopy, thereby adding a second layer of height control, in addition to physical height adjustment. Depending on the growth height of the target plant species, it is possible that only the virtual height adjustment may be sufficient to fully control the canopy height range. These added layers of height adjustment and lighting controls, whether deployed separately or in combination, create a comprehensive suite of controls to optimize plant yield and growth.

Figure 9:
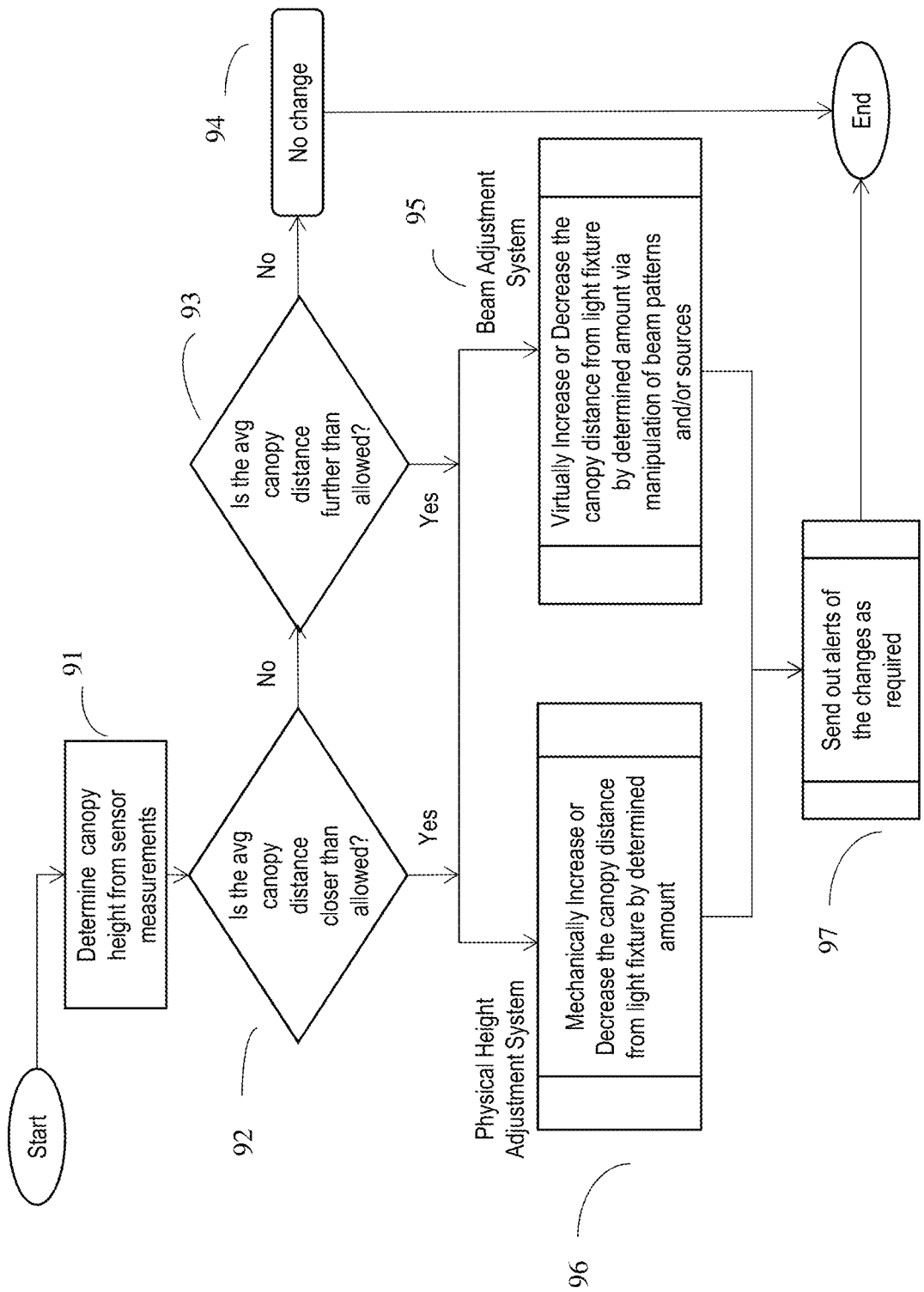
FIG. 9 illustrates an exemplary process flow diagram according to aspects of the invention.

In addition to the virtual height adjustment, the control system may control for a physical height adjustment. FIGS. 8 and 9 both illustrate a physical canopy height adjustment. In a preferred embodiment, a pulley control 83 may be coupled to any one of the control system 82, facilities resource management system, and, or any one of a proximity, moisture, time, and, or environmental sensor 81, whereby input from any one of the control system 82, facilities resource management system, and, or the sensor 81 may activate the pulley control 83 to tensionally control a line to adjust a height of at least one LED light source from a foliage canopy. Furthermore, input from the control system 82, facilities resource management system, and, or the sensor 81 may activate the pulley control 83 to tensionally control the line to adjust the height of a plurality of LED light sources from a plurality of foliage.

Preferably, the pulley control 83 may be electronically coupled to the control system 82 and a line tensionally coupled to a top surface of at least one LED light source, whereby the control system 82 controls line tension based on input related to any one of a foliage proximity, foliage moisture, foliage colors, soil chemicals, foliage growth stage, and, or growth time from any one of at least one sensor 81 disposed on a bottom surface of the at least one LED light source and, or within at least one foliage container unit. Further, the control system 82 may control line tension of a plurality of lines tensionally coupled to a plurality of LED light sources to adjust a height of the plurality of said LED light sources situated over a plurality of foliages.

Figure 10:
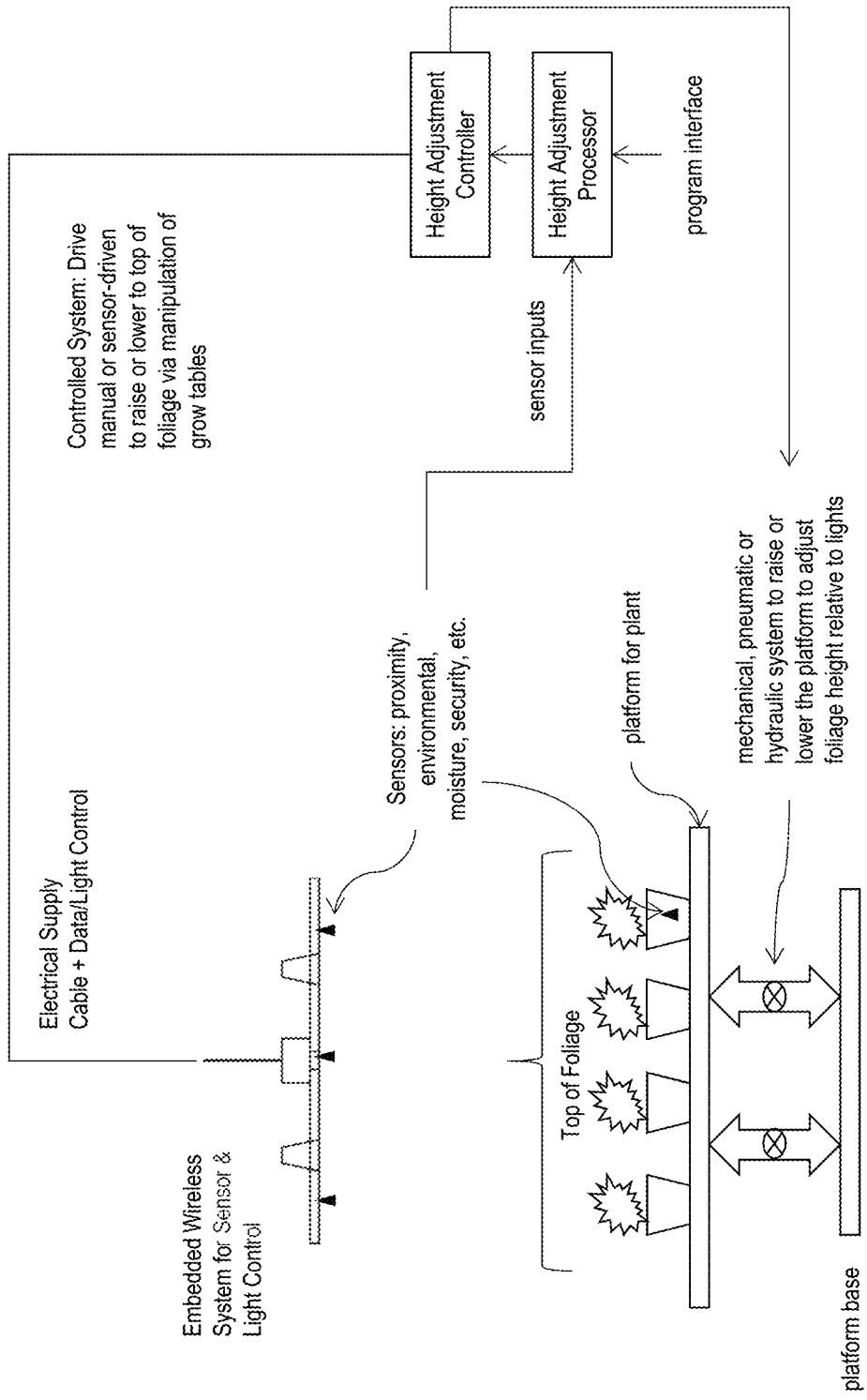
FIG. 10 illustrates an exemplary mechanical system diagram according to aspects of the invention.

In a preferred embodiment, the canopy height adjustment control system first determines canopy height based on sensor measurements 91. Is the average canopy distance below threshold values 92? If no, is the average canopy distance further than allowed 93? If no, then no change 94. If yes, to either 92 or 93, then adjust canopy height either physically 95 or virtually 96. Finally, push alerts of the canopy height adjustment changes as required 97. In alternative embodiments, a platform may be mechanically or physically be raised or lowered—rather than, or in combination to, the pulley control—in order to augment canopy-light source distance (FIG. 10).

Figure 11:
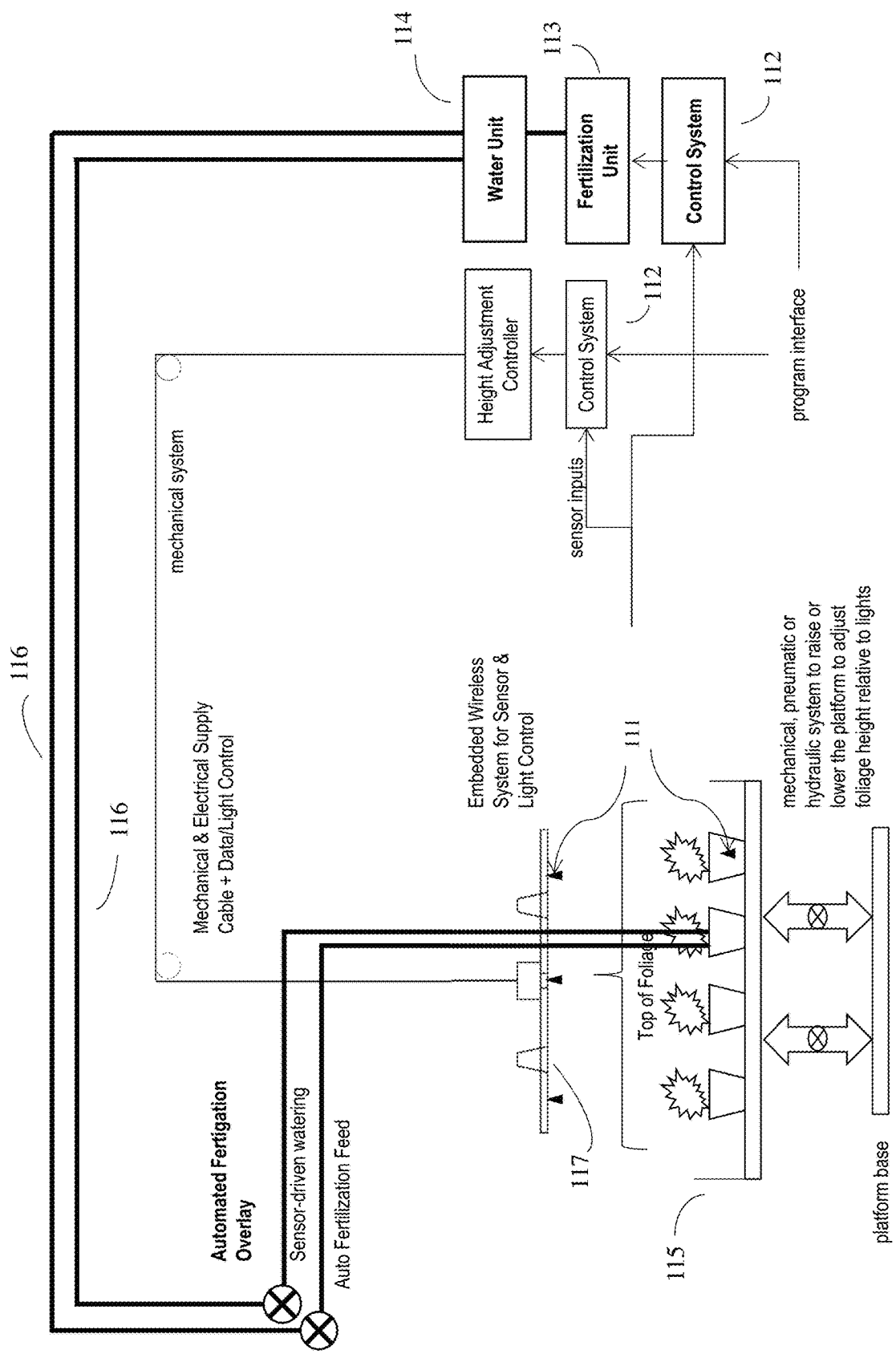
FIG. 11 illustrates an exemplary mechanical system diagram according to aspects of the invention.
Figure 12:
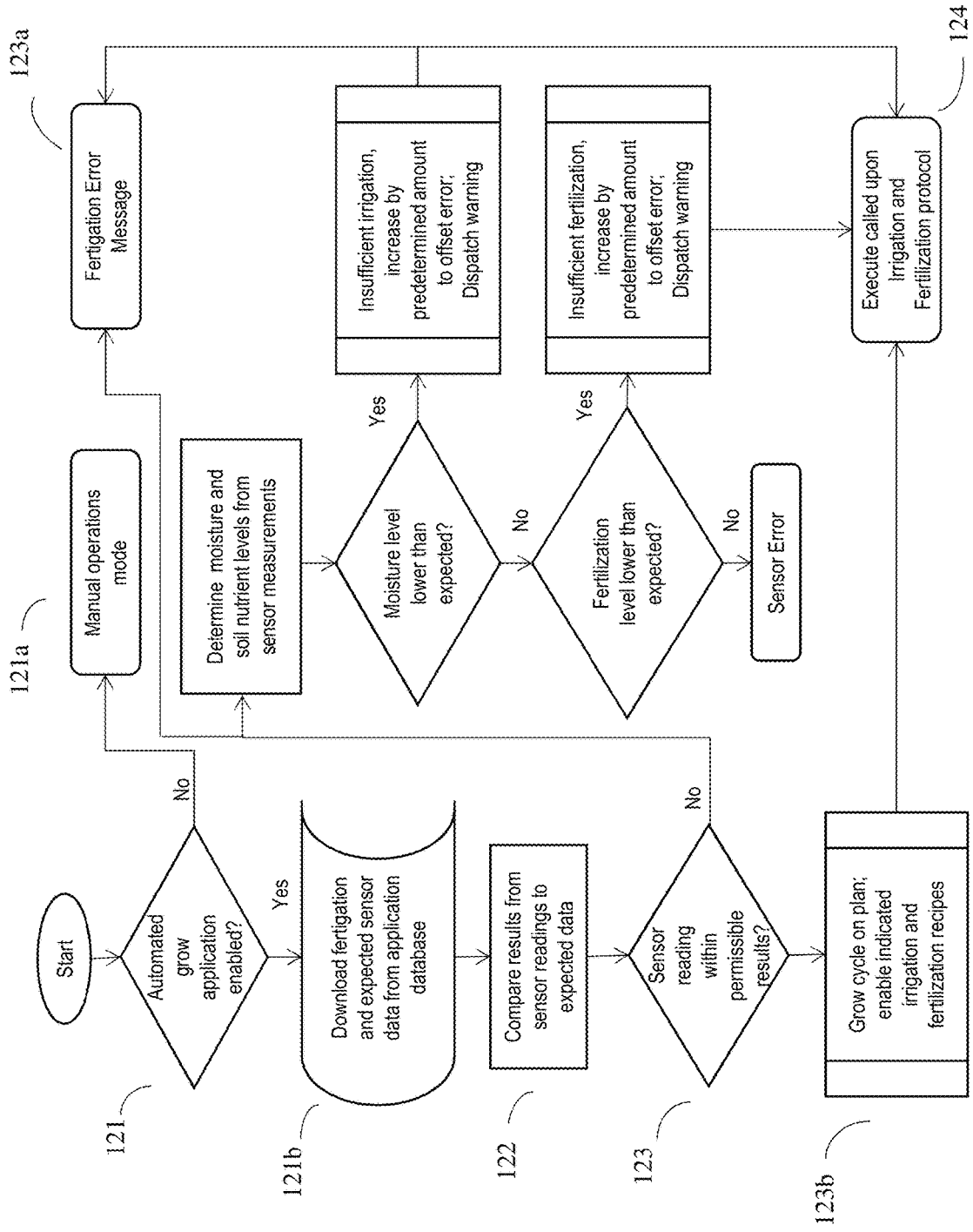
FIG. 12 illustrates an exemplary process flow diagram according to aspects of the invention.
Figure 13:
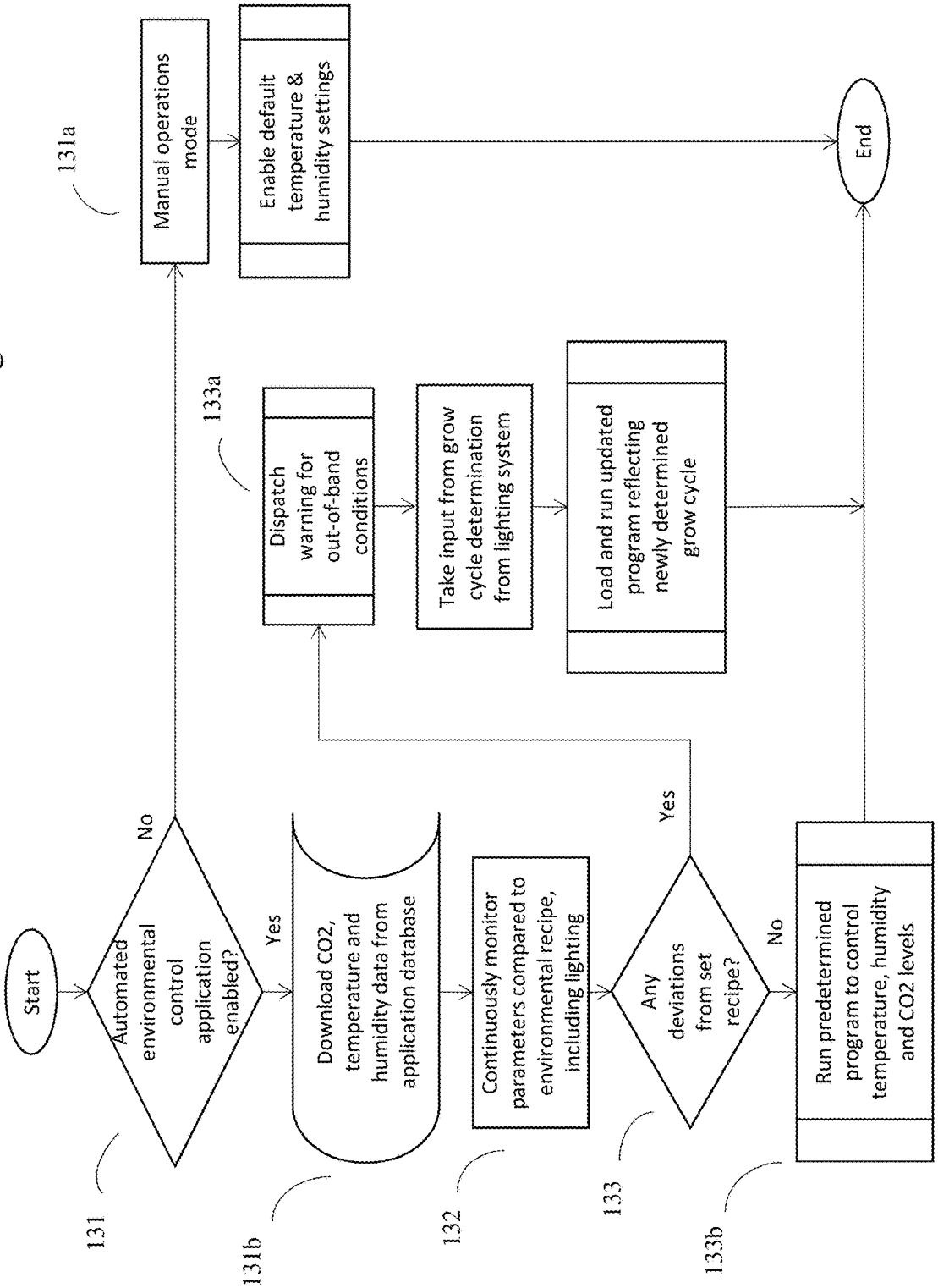
FIG. 13 illustrates an exemplary process flow diagram according to aspects of the invention.
Figure 14A:
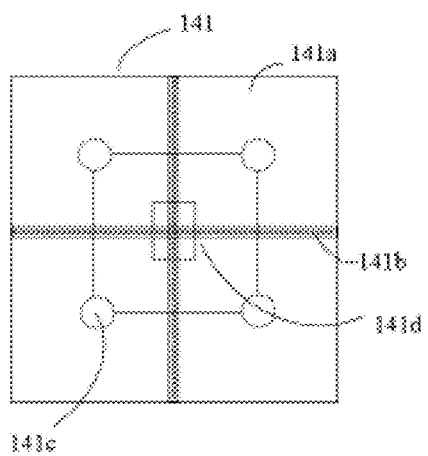
FIG. 14A illustrates an exemplary device diagram according to aspects of the invention.
Figure 14B:
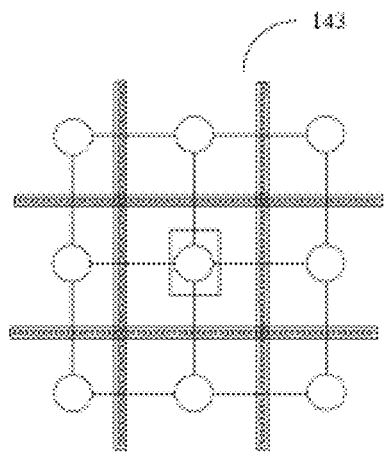
FIG. 14B illustrates an exemplary device diagram according to aspects of the invention.
Figure 14C:
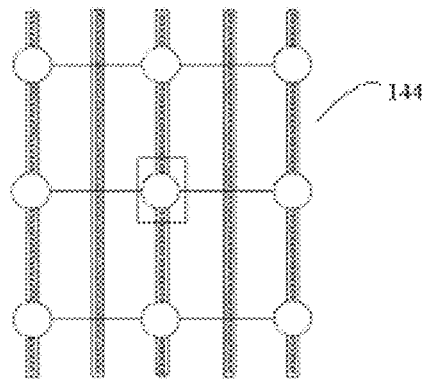
FIG. 14C illustrates an exemplary device diagram according to aspects of the invention.
Figure 14D:
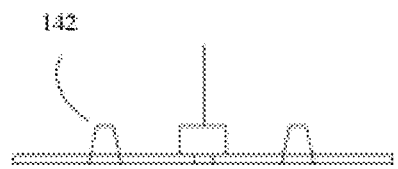
FIG. 14D illustrates an exemplary device diagram according to aspects of the invention.

Yet another group of control system features in relation to the plant growth management system are the automated irrigation, fertilization, and CO2 controls, as depicted in FIGS. 11, 12, and 13, respectively. The control system 112 and, or the facilities resource management system may be coupled to a fertilizing unit 113, watering unit 114, and, or a gas unit, wherein input from the control system 112 and, or the facilities resource management system activate any one of a feed, water, and, or gas from the fertilizing unit 113, watering unit 114, and, or gas unit, respectively. These units may further be in fluid or gaseous communication to a foliage canopy within a foliage container unit 115, through a supply line 116. Furthermore, the input from any one of the control system 112 and, or facilities resource management system is processed from a sensor input from any one of a sensor 111 disposed on a bottom surface of an LED light source 117 and, or disposed within a foliage container unit 115; and wherein the sensor is configured to detect raw input related to any one of a foliage proximity, foliage moisture, foliage and, or canopy color, soil chemical, foliage growth stage, and, or growth time. Alternatively, a sensor manager may serve as an intermediary-collecting, collating, and bundling the disparate and heterogeneous sensor input format for universal integration and downstream system control.

FIGS. 12 and 13 illustrate process flow diagrams capturing the automated irrigation, fertilization and gaseous controls, respectively. In a preferred embodiment, as a first step, the system determines if an automated grow and, or environmental control application is enabled 121, 131? If not, then a manual operations mode is tasked 121a, 131a. If the applications are enabled, download fertigation and expected sensor data from application database and, or download gas (CO2), temperature, and humidity data from the application database 121b, 131b. The system then continuously monitors and compares results from sensor readings to expected data 122, 132. If the sensor readings are within a threshold value 123, 133, then the indicated irrigation and fertilization recipes and, or temperature, humidity, and CO2 levels are enabled 123b, 133b. If not, the system dispatches an error message and proceeds through a trouble-shooting pathway 123a, 133a.

FIG. 14 illustrates a variety of perspectives of the light fixture device. Both a side perspective of a single-cross configuration (14D) and bottom view perspectives of the single-cross (14A) and multi-cross configurations (14B) are disclosed. Additionally, FIG. 14 illustrates a bottom view perspective of the multi-linear configuration of the light fixture device (14C). In a preferred embodiment, the light fixture device (14A, 14B, 14C, 14D) may be operably coupled to any one of, or combination of, a control system, facility resource management system, pulley control, watering unit, fertilizing unit, gas unit, moveable platform, sensor, and, or an array of sensors. The device may, over a network, receive at least one of a botanical characteristic data and, or facility systems data; based on the received botanical characteristic data and, or the facilities systems data control an action; and wherein the action controlled relate to varying spectral output of at least one light emitting diode (LED) channel from at least one LED light source, and, or a light beam path from at least one LED light source and a top of a foliage for causing a virtual foliage height adjustment. In other embodiments, a physical and, or virtual height adjustment of the light fixture device may be possible, thereby actually causing change in distance between the foliage canopy and the light source, or at the very least, creating the impression of distance change due to augmenting a light beam pattern. In yet other embodiments, controls for fertilization, irrigation, CO2 delivery, and other environmental controls may be operably coupled to a control system and the light fixture device, foliage container unit, and, or platform.

In its most basic form, the light fixture device may be configured in a single linear array of light emitting diode (LED) light sources (not shown). In a preferred embodiment, the light fixture devices may be configured in a cross-pattern of a linear array of LED light sources (141, 142). While a single-cross configuration may be sufficient for optimal delivery of grow controls, any number of crosses may be possible, without departing from the scope of the invention. The single cross configuration is a sufficient form factor for housing of at least one LED light source for a pointed, non-broad angle source of spectral output 14A—in addition to the linear array of spectral output sources 141b.

In continuing reference to the cross configuration, the at least one LED light source for the pointed, non-broad angle source of spectral output 141a may have a light beam pattern with no more than a 60-degree light beam angle differential in any direction from a y-axis perpendicular to the pointed LED light source 141a. Furthermore, wherein the at least one broad angle LED light source or the linear array of LED light sources 141b has a light beam pattern with no less than a 60-degree light beam angle differential in any direction from a y-axis perpendicular to the broad angle LED light source or the linear array of LED light sources 141b. Further yet, the at least one pointed LED light source 141a and the linear array of LED light sources 141b have varying light beam patterns, such that modulation of each create a virtual height adjustment between any one of the light sources and a top of a foliage.

Still in reference to the single cross configuration of the linear array of LED light sources 141 is further comprising of any one of, or combination of, at least one mechanical support rail 141c; at least one control output 141d; at least one power supply input 141d; and at least one sensor. Alternatively, the at least one control output 141d, power supply input 141d, and sensor, may be disposed outside of the light fixture device 141, 142, 143, 144. Any of the aforementioned may be disposed within the adjustable platform, foliage container unit, and, or light fixture device surrounding system and components, for instance. The single cross configuration of the linear array of LED light sources 14A is further comprising of four mechanical support rails 141c in a square configuration, wherein each rail 141c makes support contact on a top surface of at least one linear array of LED light sources 141b, such that an intersection point of the crossed-linear array of LED light sources 141b is disposed within the square of the mechanical support rails 141c. Preferably, at least one control output 141d and power supply output 141d may be disposed on the top surface of the intersection point of the crossed-linear array of LED light sources 141b; at least one sensor disposed on the bottom surface of the intersection point of the crossed-linear array of LED light sources 141b. Also, in the preferred embodiment of the cross-configuration, at least four pointed LED light sources 141a, each disposed at an intersection point of the mechanical support rails 141d in the square configuration, may be provided for. However, any configuration, with any number of mechanical support rails 141c, crossed-linear array of LED light sources 141b, pointed, non-broad angle LED light sources 141a, power supply 141d, and, or control outputs 141d may be possible and all fall within the scope of the invention.

Figure 15:
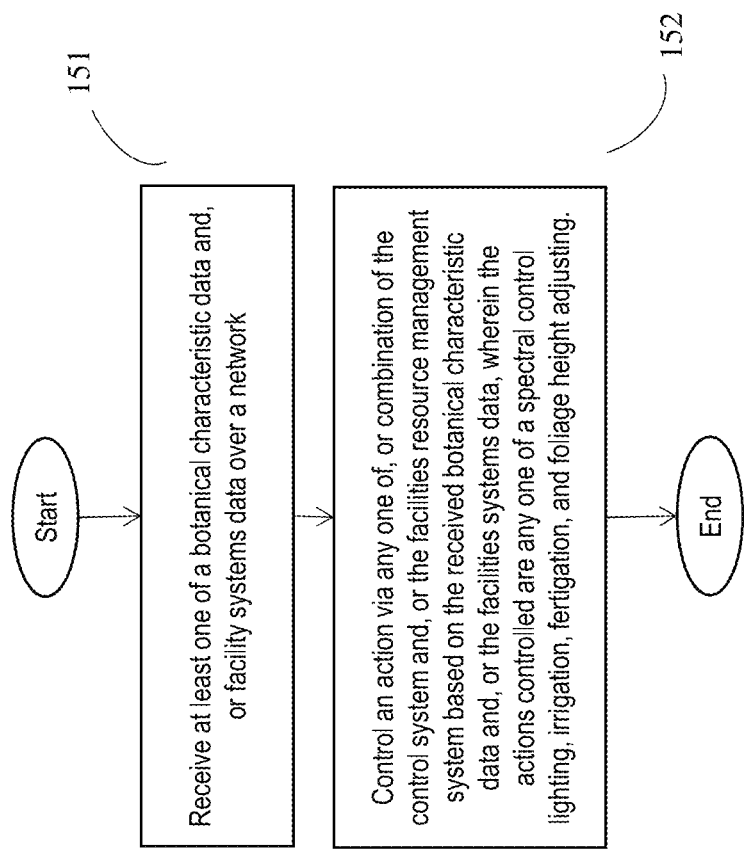
FIG. 15 illustrates an exemplary method flow diagram according to aspects of the invention.

Now in reference to FIG. 15, which depicts a method flow diagram of the plant growth management method. In an exemplary embodiment, the method comprises the steps of: receiving at least one of a botanical characteristic data and, or facility systems data over a network 151; and controlling an action via any one of, or combination of the control system and, or the facilities resource management system based on the received botanical characteristic data and, or the facilities systems data, wherein the actions controlled are any one of varying spectral output of at least one light-emitting diode (LED) channel from at least one LED light source, light brightness, and, or a light-beam path for causing a virtual foliage height adjustment 152. Moreover, further actions controlled may be irrigation, fertilization, $CO_2$ levels, temperature, humidity, and, or physical and, or virtual height adjustment 152.

The system may additionally support an automation work-flow platform. Any one of the control system and, or the facilities resource management system is supported by at least one custom application developed by at least one third party through an Application Program Interface (API) gateway. In one instance of a custom work-flow automation platform or platform application, one action controlled by any one of the control system and, or the facilities resource management system triggers a second set of actions controlled by a "if this, then that" script manager. The second set of actions controlled by the "if this, then that" script manager further comprises any one of a system override or a system shut-down. Additionally, the second set of actions may be a second set of API-mediated, non-system actions controlled by a "if this, then that" script manager. This second set of API-mediated, non-system actions controlled by the "if this, then that" script manager may be any one of, or combination of, social media alerts, social media posts, e-mail alerts, e-mail posts.

Furthermore, the API gateway may allow for user-created control recipes, wherein the "if this, then that" script manager is further embedded with an "and, or" trigger or action operators, allowing for user-created control recipes or an automation command set with increased triggers or actions. The platform or platform application may allow $3^{rd}$ parties to "create" their grow recipes of any plant and have the "system" control all lighting, fertigation, environmental and security/other systems from a single "control system". That way, a third party can "create" a new strain of a plant that they can offer for sale with the "recipe" that the buyer would run on the plant growth management system. In essence, sensor feedback is used to determine whether plant growth matches the expected results based on the recipe, and the ability to automatically "advance" or "revert" the recipe to differing grow stage based on allowed parameters of the application program. If the sensor feedback provides out-of-range and/or conflicting data that cannot be resolved by the rules engine of the recipe application program, a major error alert may be dispatched.

Figure 16:
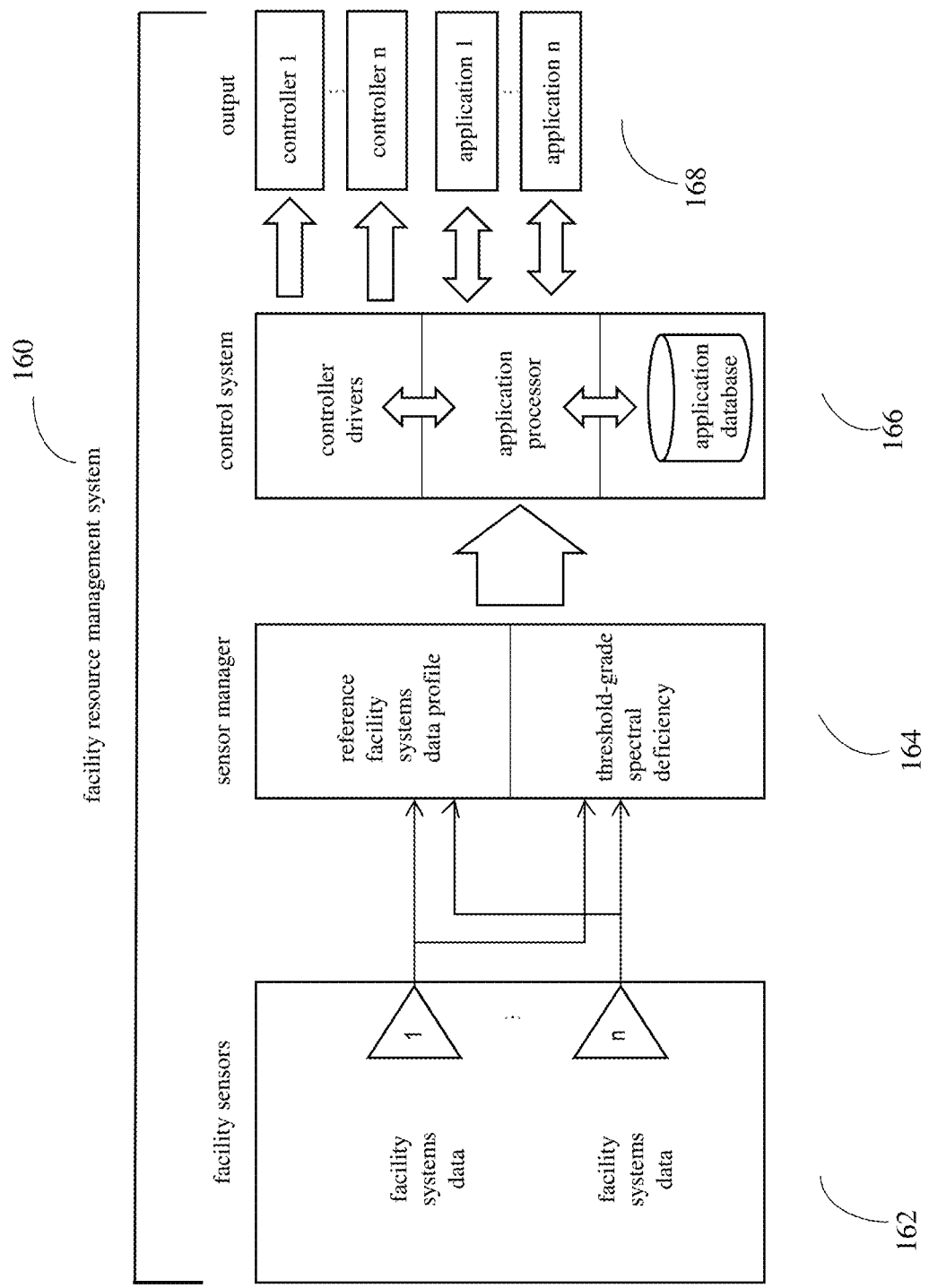
FIG. 16 illustrates an exemplary system diagram according to aspects of the invention.
Figure 17:
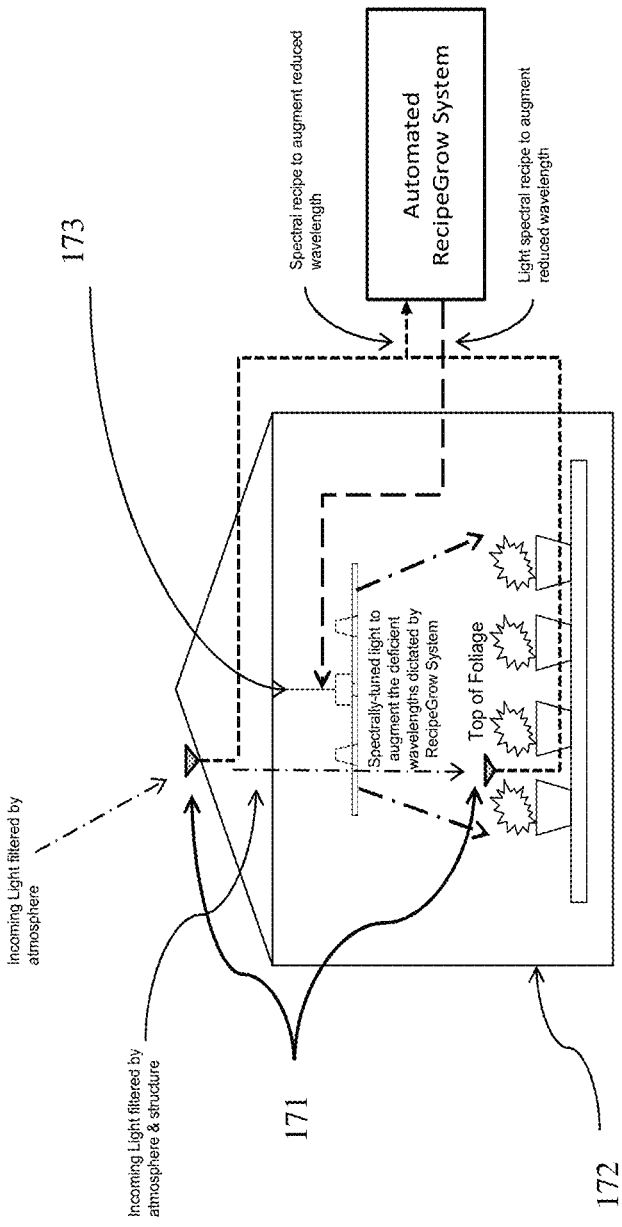
FIG. 17 illustrates a schematic diagram according to aspects of the invention.

Now in reference to FIGS. 16 and 17. FIG. 16 illustrates a system diagram of the facility resource management system 160, further comprised of at least one facility sensor 162, sensor manager 164, control systems 166, and an eventual output 168. FIG. 17 illustrates a schematic of the facility resource management system augmenting any spectrum bandgap as a result of light leeching 172 with output 173 from spectrally-tuned light devices 173. Fine tuning of the emission spectrum of at least a single light-emitting diode as a result of environmental or plant growth characteristics is vital. FIGS. 16 and 17 focus on the environmental factors driving spectral emission modulation, in particular light leeching or filtering as a result of atmospheric or structural impediments 172. The resulting gaps in spectral wavelength due to this leeching may be detected and augmented by the spectrally-tuned light devices-all driven in an automated fashion by the self-contained facility resource management system 160.

Tuning of the emission wavelength to compensate for any leeched-induced bandgap is achieved by the facility resource management system 160. This spectral deficiency-driven modulation is achieved by receiving at least one of a facility systems data by the at least one sensor 162, 171; based on the received facility systems data, determine a threshold-grade deviation between the received facility systems data and an updated reference facility systems data profile by a sensor manager 164; and based on the threshold-grade deviation, enable adaptive actuation or management of any one of, or combination of, plant growth automation system outputs 168, 173 by a controller 166.

In one embodiment, the facility systems data is at least one of any number of wavelength segments of a light spectrum of incoming light or generated light 172 detected by at least one light spectra sensor 162, 171. Additionally, the facility systems data may also include a detected deficiency within any number of wavelength segments of light spectrum by comparing a real-time, actual light spectra profile with a reference light spectra profile and determining a threshold-grade deviation by the sensor manager 164. Preferably, the incoming light 172 detected by sensors 162, 171 at the top and exterior of a facility represents the reference light spectra profile, while the light spectra 172 detected by sensors 162, 171 at the canopy-level within the facility represent the actual light spectra profile (presumably polluted by atmospheric and structural impediments). The threshold-grade deficiency between these profiles may then command a control system 166 for causing any number of appropriate operational state changes 168, 173 and, or outputs. In other embodiments, an aggregate of sensor history and other contextual data may be data points forming the basis of the reference light spectra profile.

As illustrated in FIG. 17, the spectral sensors 171 may be disposed on the top/exterior surface of a facility and, or adjacent to the top of a foliage (canopy-level). While not shown in FIG. 17, the spectral sensors 171 may also be situated on the top/interior surface of any one of side of the facility structure. In this embodiment, the spectral deficiency is determined based on a comparison of spectra captured between the top/interior sensor and the sensor at the canopy level. Moreover, while also not shown in FIG. 17, the spectral sensor 171 may be disposed adjacent to any one of a side of a foliage (sides, bottom, etc.). Furthermore, the spectral sensor 171 may be disposed on any one of a side of a foliage container unit; on any surface of a spectrally-tuned light fixture; and, or on any fixture delivering any one of a controller-mediated output. In some embodiments, an array of sensors 171 situated in the above-mentioned strategic locations may be provided to optimize the gathering of the incoming or generated light spectra 172.

Also illustrated in FIG. 17 is the process flow from facility systems input to the system output 173. In one embodiment, the output 173 actuated and, or managed by the controller is at least one of a spectral output of at least one light-emitting diode (LED) channel from at least one LED light source 173 based on a sensor manager-determined threshold-grade deviation. Although not shown in FIG. 17, light brightness and, or a light height adjustment may also be another system output 173 in response to the detected spectral deviation. Based on the presence and amount of the threshold-grade light spectra deviation from the reference light spectra profile, the controller may activate a pulley control to tensionally control the line to adjust the height of at least one LED light sources 173 from a top of at least one foliage canopy. In addition to physical height adjustment, a virtual height adjustment may also be achieved by modulating the light beam path or angle. For instance, based on the presence and amount of the threshold-grade light spectra deviation from the reference light spectra profile, the controller may modulate a degree of movement or activity from at least one of a pointed source or linear array source of LED light 173, thereby varying a virtual light height adjustment between at least one LED light source 173 and a top of at least one foliage.

Back in reference to FIG. 16, the control, synchronization, coordination, and, or calibration of these plant growth automaton system outputs 168 may be achieved by the control systems 166, operably coupled to the sensor manager 162. In addition to the above mentioned system outputs 168, such as spectral-augmentation, light brightness, and, or light height (real and virtual), there are a number of other control system 166 application processor-mediated outputs 168. One example may be that the application output 168 is operable with at least one third party interface via an Application Program Interface (API) gateway. An API gateway may allow for user-created control recipes.

Another example may be an automated growth-flow tool, wherein the application or controller output 168 triggers a second set of actions controlled by a "if this, then that" script manager. The actions triggered by an "if this, then that" script manager may be any one of a system override or a system shut-down. Another example of a second set of API-mediated, non-system actions controlled by the "if this, then that" script manager may be any one of, or combination of, social media alerts, social media posts, messages, e-mail alerts, and, or e-mail posts. To further elaborate, If the system detects a threshold-grade deficiency . . . . Then it will trigger modulation of a specific spectrally-tuned light device, while the script manager may then alert the administrator on his or her personal device of the event and which specific device was modulated.

The "if this, then that" script manager may be further embedded with an "and, or" trigger or action operators, allowing for user-created control recipes or an automation command set with increased triggers or actions. To further elaborate, If the system detects a threshold-grade deficiency . . . . Then it will trigger modulation of a specific spectrally-tuned light device, while the script manager may then alert the administrator on his or her personal device AND alter the tint of the facility glass ceiling in order to more preferentially trap light of an optimal frequency. i.e., alter the light transmission characteristics of an electrochromic, photochromic, thermochromic, or any other type of smart glass-built facility. Other possible triggers and, or commands may relate to updating an application dashboard, facility report, alert, and, or any one of botanical and, or facility system outputs.

Figure 18:
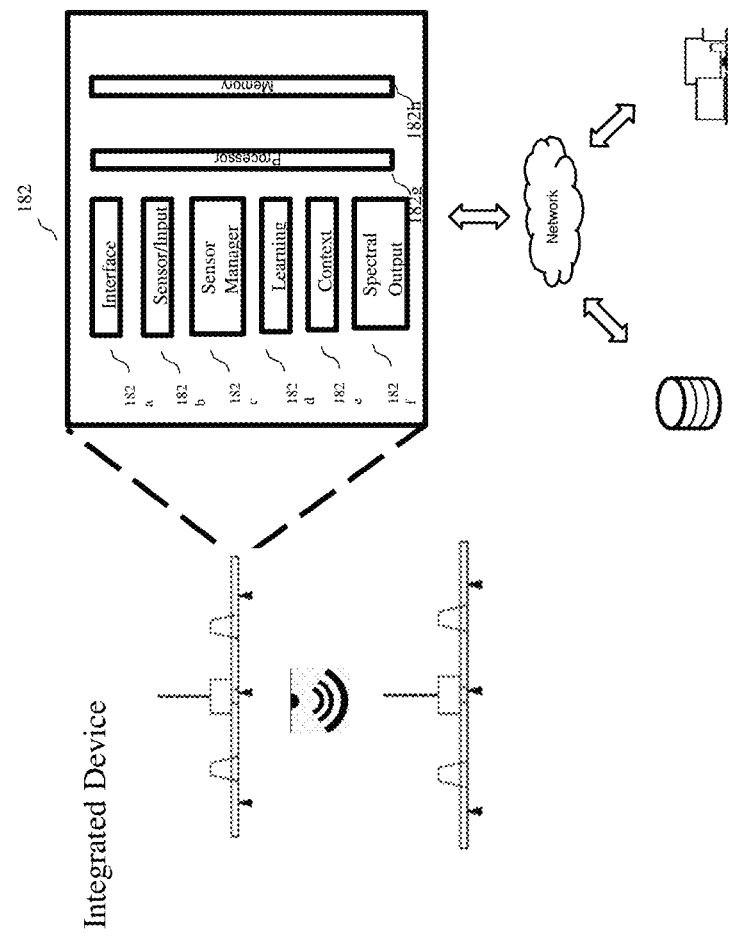
FIG. 18 illustrates a network diagram according to aspects of the invention.
Figure 19:
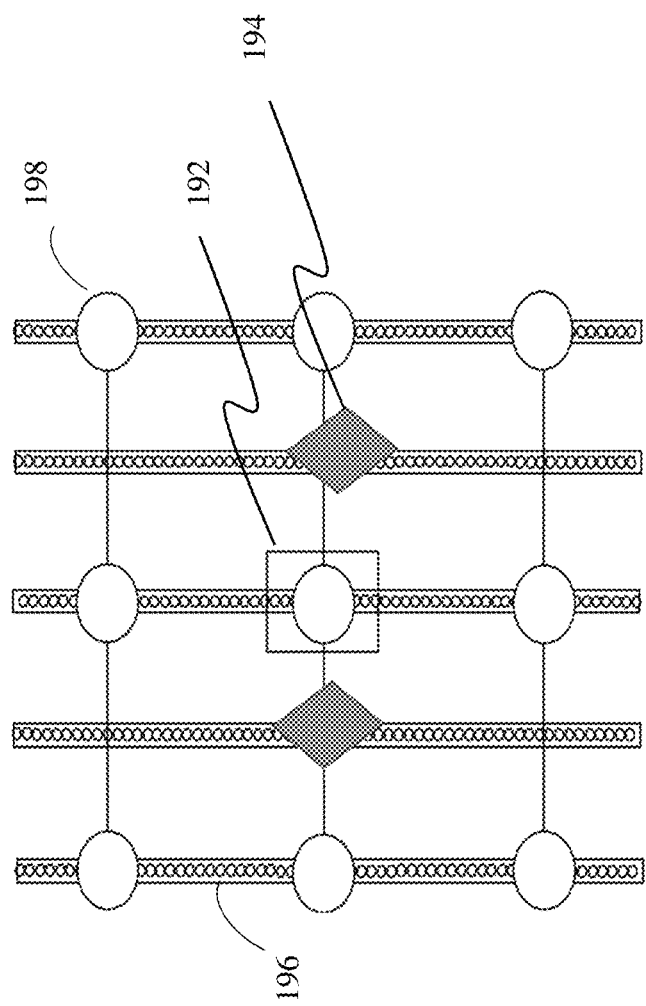
FIG. 19 illustrates a device diagram according to aspects of the invention.

FIG. 18 illustrates a network schematic with an integrated device embodiment. FIG. 19 is a bottom-up schematic of the integrated device embodiment. As illustrated in FIGS. 18 and 19, the various inputs and outputs of the plant-growth spectral augmentation system may be integrated into a single device. Such an integrated device may comprise a single or an array of sensors detecting any spectral deficiency and spectrally-tuning integrated LED's accordingly. Such a device could remain as a stand-alone detection/tuning device, or be incorporated into the/any plant-growth facility ecosystem, whereby other facility system data inputs are gathered for informing spectral tuning of said device.

In a preferred embodiment, the integrated spectral deficiency-driven control device may comprise at least one integrated sensor portion 182*b*, 194; at least one embedded sensor manager 182*c*, 192; at least one integrated multi-channel light output portion 182*f*, 196, 198; a processor 182*g*; a memory element 182*h* coupled to the processor 182*g*; encoded instructions. In a preferred embodiment, the device is further configured to receive at least one of a facility systems data 182*b* by the at least one integrated sensor portion 182*b*, 194; based on the received facility systems data 182*b*, the embedded sensor manager 182*c*, 192 determines a threshold-grade deviation between the received facility systems data 182*b* and an updated reference facility systems data profile; and based on the threshold-grade deviation, cause any one of, or combination of, spectral modulation, light intensity variation, and, or light height variation from the at least one multi-channel light output portion 182*f*, 196, 198.

In specific reference to FIG. 19, the multi-channel light output portion may be the narrow-angled, pointed output of light 198, or a broad-angled, diffused output of light 196. As shown in FIG. 19, the integrated light fixture device may be configured in a series of parallel single bars. Alternatively, a cross-pattern of a linear array of LED light sources with pointed lights 196, 198 may also be possible. While a single bar may be sufficient for optimal delivery of grow controls, any number of parallel bars or cross patterns may be possible, without departing from the scope of the invention. The single bar, parallel-bar or cross configuration is a sufficient form factor for housing of at least one LED light source for a pointed 198, non-broad angle source of spectral output—in addition to a linear array of broad-angled, diffused light output 196. In other embodiments, the single, parallel, or cross-configuration may house any number of linear arrays of broad-angled light sources 196, compounded with any number of pointed light sources 198; any number of sensors 194, and at least one integrated sensor manager 192.

With respect to the cross configuration (not shown), the linear array of broad-angled light sources 196 is further affixed or disposed in a cross-configuration within square mechanical support rails. The mechanical support rails may have a pointed light output 198 at each corner of the square rails. Additionally, the linear-array of broad light sources 196 may be disposed/affixed in a cross configuration within the square rails, with at least one sensor 194 disposed in the center of the square rails and, or the cross-linear array. The square rails, moreover, may further consist of a sensor manager/controller 192 on a single corner. While also not shown in FIG. 19, each square rail/cross-array of lights may further comprise at least one control output; and, or at least one power supply input. Each square rail with an affixed cross-array of broad lights 196 may be combined with any number of additional, distinct rail/cross light devices. Any of the aforementioned may be disposed within the adjustable platform, foliage container unit, and, or light fixture device surrounding system and components, for instance. The light fixture device may be integrated into any plant growth automation ecosystem.

In yet other embodiments, as illustrated by FIGS. 18/19, the device is further configured to receive at least one of a facility systems data 182*b* by the at least one integrated sensor portion 182*b*, 194. The received facility systems data 182*b* may be at least one of any number of wavelength segments of a light spectrum of facility-incoming or facility-generated light detected by at least one light spectra sensor 182*b*, 194. The sensor 182*b*, 194 may be further configured for detecting the light spectra at the canopy-level by capturing canopy-reflected light. The integrated or embedded sensor manager 192 may detect a deficiency within any number of wavelength segments of light spectrum and compare the canopy-level light spectra against a reference light spectra profile. Again, the reference light spectra profile may be any one of, or combination of, light spectra detected by sensors 182*b*, 194 at the top/exterior of a facility, exterior of the facility, top/interior of the facility, interior of the facility, sensor history, contextual data, etc. Preferably, the reference light spectra profile comprises the light spectra detected by sensors disposed on the top/exterior of a facility as a means to gather light unpolluted by structural and, or atmospheric impediments. The integrated sensor manager 192 may determine a threshold-grade deviation for causing an operational state change and, or controller-mediated output. The operational state change may include any one of, or combination of, spectral modulation, light intensity variation, and, or light height variation from the at least one multi-channel light output portion 182*f*, 196, 198. Other operational state changes may also include changes to system phases, modes, and states.

Figure 20:
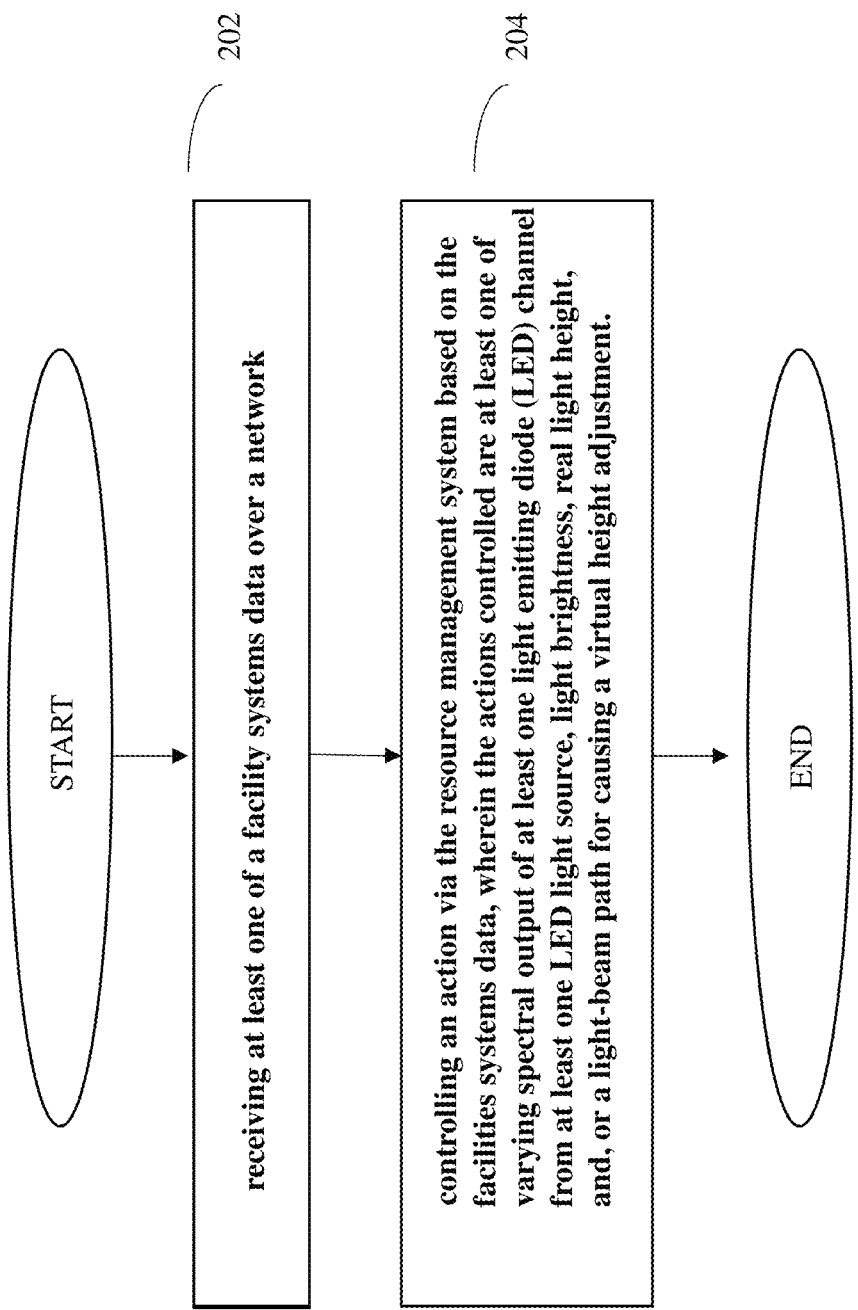
FIG. 20 illustrates a method flow diagram according to aspects of the invention.

FIG. 20 illustrates the steps involved in a spectral deficiency-driven method, the method comprising the steps of: (1) receiving at least one of a facility systems data over a network 202; and (2) controlling an action via any one of, or combination of a facilities resource management system based on the facilities systems data, wherein the actions controlled are at least one of varying spectral output of at least one light-emitting diode (LED) channel from at least one LED light source, light brightness, real light height, and, or a light-beam path for causing a virtual foliage height adjustment 204.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus it will be understood by those skilled in the art of infrastructure management, and more specifically automated infrastructure management especially pertaining to data centers, that although the preferred and alternate embodiments have been shown and described in accordance with the Patent Statutes, the invention is not limited thereto or thereby.

The figures illustrate the architecture, functionality, and operation of possible implementations of systems, methods and computer program products according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention and some of its advantages have been described in detail for some embodiments. It should be understood that although the system and process is described with reference to automated power management and optimization in plant growth centers, the system and process is highly reconfigurable, and may be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

I claim:

1. A spectral deficiency-driven control system in a plant growth automation, said system comprising:
   a facilities resource management system;
   a processor;
   a memory element coupled to the processor;
   encoded instructions;
   wherein the control system is further configured to:
      over a network, receive at least one of a facility systems data;
      based on the received facility systems data, control an action via the facilities resource management system;
   wherein the received facility systems data is gathered via at least one facility sensor configured to detect at least one of: facility-incoming and facility-generated light spectra and a sensor manager for determining a deficiency in light spectra; and
   wherein the action controlled by the facilities resource management system is augmenting at least one of a spectral output of at least one light-emitting diode (LED) channel from at least one LED light source; light brightness; and a light height adjustment, based on said deficiency.

2. The system of claim 1, wherein the facilities resource management system comprises at least one of at least one facility sensor configured for detecting at least one of facility-incoming and facility-generated light spectra; at least one sensor manager for aggregating light spectra data from the at least one of the facility sensors; a processor for detecting a threshold-grade light spectra deviation from a reference light spectra profile; and a controller for augmenting at least one of a spectral output of at least one light-emitting diode (LED) channel from at least one LED light source; light brightness; real light height adjustment; and a virtual light height adjustment based on a presence and amount of the threshold-grade light spectra deviation from the reference light spectra profile.

3. The system of claim 2, wherein the facilities resource management system, based on the presence and amount of the threshold-grade light spectra deviation from the reference light spectra profile, vary a spectral output of at least one of a plurality of light emitting diode (LED) spectral channels from at least a single LED light source or from an array of LED light sources.

4. The system of claim 2, wherein the facilities resource management system, based on the presence and amount of the threshold-grade light spectra deviation from the reference light spectra profile, activate a pulley control to tensionally control the line to adjust the height of at least one LED light sources from a top of at least one foliage canopy.

5. The system of claim 2, wherein the facilities resource management system, based on the presence and amount of the threshold-grade light spectra deviation from the reference light spectra profile, vary a light intensity from at least one LED light source to a top, side, and, or bottom of at least one foliage.

6. The system of claim 2, wherein the facilities resource management system, based on the presence and amount of the threshold-grade light spectra deviation from the reference light spectra profile, vary a light beam path, thereby varying a virtual light height adjustment between at least one LED light source and a top of at least one foliage by modulating a degree of movement or activity from at least one of a pointed source or linear array source of LED light.

7. The system of claim 2, wherein the reference light spectra profile comprises light spectra data from sensors disposed on a top and exterior of a facility, wherein incoming light is unimpeded by structural or atmospheric impediments.

8. The system of claim 7, wherein the reference light spectra profile comprises an aggregate of light spectra data of gathered incoming light unimpeded by structural or atmospheric impediments, over a period of time.

9. The system of claim 1, wherein the at least one facility sensor is at least one of a spectrometer, spectral radiometer, and a photo sensor configured for detecting at least one of a facility-incoming and a facility-generated, light spectra; operably communicative with at least one of a sensor manager and, or a processor for detecting a threshold-grade light spectra deviation from a reference light spectra profile; and capable of augmenting at least one of a controller-mediated function based on said deviation.

10. The system of claim 9, wherein the at least one facility sensor is disposed on at least one of an exterior or interior of a plant growth facility; top of a foliage canopy; top of a foliage soil bed; on any one of a side of a foliage container unit; on any one of a side of a rack of foliage container units; on any surface of a spectrally-tuned light fixture; and, or on any fixture delivering any one of a controller-mediated output.

11. The system of claim 9, wherein any one of the controller-mediated function is operable with at least one third party interface via an Application Program Interface (API) gateway.

12. The system of claim 9, wherein any one of the controller-mediated function action triggers a second set of actions controlled by a—if this, then that—script manager.

13. The system of claim 1, wherein the deficiency in light spectra is determined by comparing actual light spectra at a plant canopy-level against a reference light spectra profile by the sensor manager.

14. The system of claim 1, wherein the determined deficiency in light spectra is by comparing an actual spectra profile against a probabilistic-modeled reference light spectra profile to determine a threshold-grade discrepancy.

15. The system of claim 1,
wherein the facility resource management system receives facility systems data corresponding to soil characteristics, and
an action controlled by the facilities resource management system is to dispense at least one of fertilizer and water to the soil.

16. The system of claim 1, wherein the deficiency is adequate energy control, causing a need for temperature regulation, as a result of the light spectra inherent energy.

17. The system of claim 16, wherein the height of at least one LED light source is adjusted in response to the deficiency.

18. The system of claim 1, wherein
the system continually stores received facilities system data, in the memory, and
the encoded instructions include algorithms for machine learning based on the stored facilities system data, enabling the system to learn and self-optimize in response to plant growth patterns.

19. A spectral deficiency-driven control system in a plant growth automation, said system comprising:
at least one sensor configured to detect any number of segments of a light spectrum of at least one of facility-incoming and facility-generated light;
at least one sensor manager capable of detecting a deficiency within any number of segments of light spectrum of the detected facility light by comparing an actual light spectra profile with a reference light spectra profile and determining a threshold-grade deviation;
at least one controller for at least one of actuating and managing at least one of a plant growth automation system output based on said threshold-grade deviation; and
wherein the controller is operably coupled to the sensor manager for causing any one of, or combination of, control, synchronization, coordination, and calibration of plant growth automaton systems, thereby enabling at least one of adaptive actuation and management of plant growth automation system outputs based on the determined threshold-grade deviation.

20. The system of claim 19, wherein the plant growth automation system output is at least one of a spectral output of at least one light-emitting diode (LED) channel from at least one LED light source; light brightness; and a light height adjustment, based on the sensor manager-determined threshold-grade deviation.

21. A spectral deficiency-driven control device in a plant growth automation, said device comprising:
at least one integrated sensor portion;
at least one integrated sensor manager;
a processor;
a memory element coupled to the processor;
encoded instructions;
wherein the device is further configured to:
receive at least one of a facility systems data by the at least one integrated sensor portion;

based on the received facility systems data, the sensor manager determines a threshold-grade deviation between the received facility systems data and an updated reference facility systems data profile; and
based on the threshold-grade deviation, cause any one of, or combination of, control, synchronization, coordination, and calibration of any number of plant growth automaton system outputs, thereby enabling adaptive actuation or management of plant growth automation system outputs.

22. The device of claim 21, wherein the received facility systems data is at least one of any number of wavelength segments of a light spectrum of incoming light detected by at least one light spectra sensor and, or a detected deficiency within any number of wavelength segments of light spectrum by comparing an actual light spectra profile with a reference light spectra profile and determining a threshold-grade deviation for causing an operational state change.

23. The device of claim 21, wherein the plant growth automation system outputs are at least one of varying spectral output of at least one light emitting diode (LED) channel from at least one LED light source, varying a light brightness, varying a real height from at least one LED light source and a top of a foliage, and, or varying a light beam path from at least one LED light source and a top of a foliage for causing a virtual foliage height adjustment.

24. The device of claim 21, wherein the facility systems data comprises actual light spectra at a plant canopy-level and the deviation in light spectra is determined by comparing the actual light spectra against a reference light spectra profile by the sensor manager.

25. The device of claim 24, wherein the actual light spectra at the plant canopy-level is detected by integrated sensors configured for measuring light spectra reflected from the top of the canopy.

26. The system of claim 21, wherein the reference facility systems data profile comprises light spectra data from at least one sensor disposed on a top and exterior of a facility, wherein the incoming light sensed is unimpeded by structural or atmospheric impediments.

27. The system of claim 21, wherein the reference facility systems data profile comprises an aggregate of light spectra data of sensed incoming light unimpeded by structural or atmospheric impediments, over a period of time.

28. The system of claim 21, wherein the deviation in light spectra is by comparing an actual facility systems data against a probabilistic-modeled reference facility systems data profile to determine a threshold-grade discrepancy.

29. A spectral deficiency-driven method, said method comprising the steps of:
sensing at least one facility characteristic by at least one facility sensor, generating facility systems data,
wherein at least one facility systems data corresponds to wavelength segments of a light spectrum,
receiving, by a plant growth management system, at least one of a facility systems data over a network; and
wherein, the plant growth management system comprises a control system, comprising a controller, and a facilities resource management system comprising a processor, a memory, and encoded instructions,
comparing a real-time light spectra profile, composed from the light spectrum facility systems data, with a reference light spectra profile and determining a threshold-grade deviation for causing an operation state change of a plant growth automation,
controlling, by the plant growth management system, an action via any one of, or combination of a facilities resource management system based on the facilities systems data, wherein the actions controlled are at least one of varying spectral output of at least one light-emitting diode (LED) channel from at least one LED light source, light brightness, real light height, and a light-beam path for causing a virtual foliage height adjustment.

* * * * *